United States Patent
Ohta

(10) Patent No.: US 12,047,997 B2
(45) Date of Patent: Jul. 23, 2024

(54) TRANSMISSION DEVICE, WIRELESS COMMUNICATION METHOD, WIRELESS COMMUNICATION SYSTEM, AND RECEPTION DEVICE

(71) Applicant: FUJITSU LIMITED, Kawasaki (JP)

(72) Inventor: Yoshiaki Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/960,175

(22) Filed: Oct. 5, 2022

(65) Prior Publication Data

US 2023/0027699 A1 Jan. 26, 2023

Related U.S. Application Data

(63) Continuation of application No. 16/992,044, filed on Aug. 12, 2020, now Pat. No. 11,497,039, which is a
(Continued)

(51) Int. Cl.
*H04W 72/566* (2023.01)
*H04W 72/1268* (2023.01)
*H04W 80/02* (2009.01)

(52) U.S. Cl.
CPC ..... *H04W 72/569* (2023.01); *H04W 72/1268* (2013.01); *H04W 80/02* (2013.01)

(58) Field of Classification Search
CPC ......... H04W 72/1242; H04W 72/1268; H04W 80/02; H04W 28/14; H04W 72/10; H04W 28/18; H04W 72/12
See application file for complete search history.

(56) References Cited

U.S. PATENT DOCUMENTS 10,582,413 B2  3/2020 Babaei et al.
10,856,174 B2 * 12/2020 Babaei .................. H04W 72/23
(Continued)

FOREIGN PATENT DOCUMENTS

WO  2008/156275 A2  12/2008
WO  2017/172789 A1  10/2017
WO  WO-2017172789 A1 * 10/2017 ........... H04L 1/1812

OTHER PUBLICATIONS

International Search Report and Written Opinion of the International Searching Authority issued for corresponding International Patent Application No. PCT/JP2018/005189 and mailed May 15, 2018, with an English translation.
(Continued)

*Primary Examiner* — Nathan S Taylor
(74) *Attorney, Agent, or Firm* — Myers Wolin, LLC

(57) ABSTRACT

A transmission device includes a communication circuit configured to wirelessly communicate with a reception device, by using a plurality of wireless services including a first wireless service having a first priority and a second wireless service having a second priority that is a priority lower than the first priority, and a processing circuit configured to perform, in accordance with a first information element, allocating of an uplink radio resource to transmission data of the first wireless service, the allocating of the uplink radio resource being performed in a situation, the situation being a situation that a medium access control-protocol data unit (MAC-PDU) has been generated or can be generated in response to allocating the uplink radio resource to a transmission data of the second wireless service, the first information element indicating a value configured to control logical channel prioritization (LCP) procedure.

4 Claims, 23 Drawing Sheets

Related U.S. Application Data continuation of application No. PCT/JP2018/005189, filed on Feb. 15, 2018.

(56) References Cited

U.S. PATENT DOCUMENTS

| | | | |
|---|---|---|---|
| 10,863,380 B2* | 12/2020 | Babaei | H04W 24/08 |
| 10,873,934 B2 | 12/2020 | Babaei et al. | |
| 2009/0013153 A1* | 1/2009 | Hilton | G06F 9/5077 712/30 |
| 2010/0118796 A1 | 5/2010 | Yi et al. | |
| 2017/0318594 A1 | 11/2017 | Babaei et al. | |
| 2018/0139030 A1 | 5/2018 | Kim et al. | |
| 2018/0146398 A1 | 5/2018 | Kim et al. | |
| 2018/0249513 A1 | 8/2018 | Chang et al. | |
| 2018/0270698 A1* | 9/2018 | Babaei | H04W 24/08 |
| 2018/0270699 A1 | 9/2018 | Babaei et al. | |
| 2018/0270700 A1 | 9/2018 | Babaei et al. | |
| 2018/0270713 A1* | 9/2018 | Park | H04L 5/0053 |
| 2018/0270791 A1* | 9/2018 | Park | H04W 8/24 |
| 2018/0270792 A1* | 9/2018 | Park | H04W 68/02 |
| 2018/0270894 A1* | 9/2018 | Park | H04W 76/14 |
| 2018/0270895 A1* | 9/2018 | Park | H04W 24/04 |
| 2018/0279229 A1* | 9/2018 | Dinan | H04W 74/0833 |
| 2018/0279262 A1* | 9/2018 | Babaei | H04L 1/1848 |
| 2018/0279358 A1 | 9/2018 | Babaei et al. | |
| 2018/0324635 A1 | 11/2018 | Babaei et al. | |
| 2018/0324844 A1 | 11/2018 | Babaei et al. | |
| 2018/0324872 A1 | 11/2018 | Babaei et al. | |
| 2018/0368132 A1 | 12/2018 | Babaei et al. | |
| 2018/0368173 A1 | 12/2018 | Shaheen et al. | |
| 2019/0068317 A1 | 2/2019 | Babaei et al. | |
| 2019/0075563 A1 | 3/2019 | Babaei et al. | |
| 2019/0098533 A1* | 3/2019 | Babaei | H04L 1/08 |
| 2019/0098580 A1 | 3/2019 | Babaei et al. | |
| 2019/0124715 A1 | 4/2019 | Chen et al. | |
| 2019/0132857 A1 | 5/2019 | Babaei et al. | |
| 2019/0149380 A1 | 5/2019 | Babaei et al. | |
| 2019/0182896 A1 | 6/2019 | Shrestha et al. | |
| 2019/0253941 A1 | 8/2019 | Cirik et al. | |
| 2019/0288789 A1* | 9/2019 | Li | H04W 72/20 |
| 2019/0394012 A1 | 12/2019 | Kim et al. | |
| 2020/0196327 A1* | 6/2020 | Zhang | H04W 72/21 |
| 2020/0305186 A1* | 9/2020 | Alfarhan | H04W 72/23 |
| 2021/0234640 A1* | 7/2021 | Cirik | H04L 1/1819 |
| 2021/0392664 A1* | 12/2021 | Alabbasi | H04W 72/1268 |

OTHER PUBLICATIONS

ZTE, ZTE Microelectronics, "URLLC and eMBB Frame structure and multiplexing", 3GPP TSG-RAN WG1 Meeting #86B R1-1608957, Agenda item 8.1.2.2., Oct. 10-14, 2016, Lisbon, Portugal.
ETRI, "Resource allocation and transmission scheme for URLLC grant-free transmission", 3GPP TSG-RAN WG1 NR Ad-Hoc#2, R1-1710621, Agenda item 5.1.3.3.3, Jun. 27-30, 2017, Qingdao, P. R. China.
Huawei, Hisilicon, "Discussion on UL multiplexing of grant-based eMBB and URLLC", 3GPP TSG-RAN WG1 NR Ad-Hoc Meeting, R1-1711430, Agenda item 5.1.3.3.9, Jun. 27-30, 2017, Qingdao, P. R. China.
Qualcomm, "On reliable transmission of URLLC data", 3GPP TSG-RAN WG2 Meeting RAN2 #99 R2-1709125, Agenda item 10.3.1.8., Aug. 21-25, 2017, Berlin, Germany.
ITU-R, Recommendation M.2083-0, "IMT Vision—Framework and overall objectives of the future development of IMT for 2020 and beyond", M Series, Mobile, radiodetermination, amateur and related satellite services, Sep. 2015, pp. 1-19, International Telecommunication Union, Geneva.
Extended European search report with supplementary European search report and the European search opinion issued by the European Patent Office for corresponding European Patent Application No. 18906332.4-1215, mailed on Dec. 1, 2020.
Notice of Reasons for Refusal issued by the Japan Patent Office for corresponding Japanese Patent Application No. 2019-571869 and mailed on Mar. 29, 2022, with an English translation.
Huawei et al., "LCP priority and procedure", Agenda Item: 10.3.1.7, 3GPP-TSG RAN2 Meeting #99bis, R2-1710372 (Resubmission of R2-1708910), Prague, Czech Republic, Oct. 9-13, 2017.
Samsung, "Determining Value of X for LCP", Agenda Item: 10.3.1.13, 3GPP-TSG RAN WG2 Meeting #99bis, R2-1711261 (Resubmission of R2-1709227), Prague, Czech Republic, Oct. 9-13, 2017.
Interdigital Inc., "Logical Channel Selection in LCP", Agenda Item: 10.3.1.7, 3GPP TSG-RAN WG2 Meeting #99bis, R2-1710660, Prague, Czech Republic, Oct. 9-13, 2017.
Interdigital Communications, "LCP and Scheduling Aspects for Multiple Numerologies", Agenda Item: 3.2.1.2, 3GPP TSG-RAN WG2 Ad Hoc, R2-1700236, Spokane, Washington, Jan. 17-19, 2017.
Notice of Reasons for Refusal issued by the Japan Patent Office for corresponding Japanese Patent Application No. 2019-571869, dated Aug. 23, 2022, with an English machine translation.
Non-Final Office Action issued by the United States Patent and Trademark Office for corresponding U.S. Appl. No. 16/992,044, electronically delivered on Sep. 29, 2021.
Final Office Action issued by the United States Patent and Trademark Office for corresponding U.S. Appl. No. 16/992,044, electronically delivered on Mar. 14, 2022.
Notice of Allowance issued by the United States Patent and Trademark Office for corresponding U.S. Appl. No. 16/992,044, electronically delivered on Jul. 6, 2022.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology; Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, 3rd Generation Partnership Project; Technical Specification Group Radio Access Network; Study on New Radio Access Technology; Radio Interface Protocol Aspects (Release 14), Mar. 2017.
3GPP TR 38.900 V14.3.1, "3rd Generation Partnership Project; Technical Specification Group Radio Access Network; Study on channel model for frequency spectrum above 6 GHz (Release 14)", Jul. 2017.
3GPP TR 38.912 V14.1.0, "3rd Generation Partnership Project; Technical Specification Group Radio Access Network; Study on New Radio (NR) access technology (Release 14)", Jun. 2017.
3GPP TR 38.913 V14.3.0, "3rd Generation Partnership Project; Technical Specification Group Radio Access Network; Study on Scenarios and Requirements for Next Generation Access Technologies; (Release 14)", Jun. 2017.
3GPP TS 36.211 V14.4.0, "3rd Generation Partnership Project; Technical Specification Group Radio Access Network; Evolved Universal Terrestrial Radio Access (E-UTRA); Physical channels and modulation (Release 14)", Sep. 2017.
3GPP TS 36.212 V14.4.0, "3rd Generation Partnership Project; Technical Specification Group Radio Access Network; Evolved Universal Terrestrial Radio Access (E-UTRA); Multiplexing and channel coding (Release 14)", Sep. 2017.
3GPP TS 36.213 V14.4.0, "3rd Generation Partnership Project; Technical Specification Group Radio Access Network; Evolved Universal Terrestrial Radio Access (E-UTRA); Physical layer procedures (Release 14)", Sep. 2017.
3GPP TS 36.300 V14.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", Sep. 2017.

(56) References Cited

OTHER PUBLICATIONS

3GPP TS 36.321 V14.4.0, "3rd Generation Partnership Project; Technical Specification Group Radio Access Network; Evolved Universal Terrestrial Radio Access (E-UTRA); Medium Access Control (MAC) protocol specification (Release 14)", Sep. 2017.
3GPP TS 36.322 V14.1.0, "3rd Generation Partnership Project; Technical Specification Group Radio Access Network; Evolved Universal Terrestrial Radio Access (E-UTRA); Radio Link Control (RLC) protocol specification (Release 14)", Sep. 2017.
3GPP TS 36.323 V14.4.0, "3rd Generation Partnership Project; Technical Specification Group Radio Access Network; Evolved Universal Terrestrial Radio Access (E-UTRA); Packet Data Convergence Protocol (PDCP) specification (Release 14)", Sep. 2017.
3GPP TS 36.331 V14.4.0, "3rd Generation Partnership Project; Technical Specification Group Radio Access Network; Evolved Universal Terrestrial Radio Access (E-UTRA); Radio Resource Control (RRC); Protocol specification (Release 14)", Sep. 2017.
3GPP TS 36.413 V14.4.0, "3rd Generation Partnership Project; Technical Specification Group Radio Access Network; Evolved Universal Terrestrial Radio Access Network (E-UTRAN); S1 Application Protocol (S1AP) (Release 14)", Sep. 2017.
3GPP TS 36.423 V14.4.0, "3rd Generation Partnership Project; Technical Specification Group Radio Access Network; Evolved Universal Terrestrial Radio Access Network (E-UTRAN); X2 application protocol (X2AP) (Release 14)", Sep. 2017.
3GPP TS 36.425 V14.0.0, "3rd Generation Partnership Project; Technical Specification Group Radio Access Network; Evolved Universal Terrestrial Radio Access Network (E-UTRAN); X2 interface user plane protocol (Release 14)", Mar. 2017.
TSG-RAN WG2, "Presentation of specification TS 37.340, version 2.0.0.", 3GPP TSG-RAN WG2 Meeting#77 RP-172464, Dec. 18-21, 2017, Lisbon, Portugal.
3GPP TS 38.201 V1.1.0, "3rd Generation Partnership Project; Technical Specification Group Radio Access Network; NR; Physical layer; General description (Release 15)", Nov. 2017.
Qualcomm, "TS 38.202 v.1.1.0. NR; Physical layer services provided by physical layer", 3GPP TSG-RAN WG1 Meeting RAN1 #91 R1-1721047, Agenda item 7, Nov. 27-Dec. 1, 2017, Reno, USA.
3GPP TS 38.211 V1.2.0, "3rd Generation Partnership Project; Technical Specification Group Radio Access Network; NR; Physical channels and modulation (Release 15)", Nov. 2017.
3GPP TS 38.212 V1.2.0, "3rd Generation Partnership Project; Technical Specification Group Radio Access Network; NR; Multiplexing and channel coding (Release 15)", Nov. 2017.
3GPP TS 38.213 V1.2.0, "3rd Generation Partnership Project; Technical Specification Group Radio Access Network; NR; Physical layer procedures for control (Release 15)", Nov. 2017.
3GPP TS 38.214 V1.2.0, "3rd Generation Partnership Project; Technical Specification Group Radio Access Network; NR; Physical layer procedures for data (Release 15)", Nov. 2017.
3GPP TS 38.215 V1.2.0, "3rd Generation Partnership Project; Technical Specification Group Radio Access Network; NR; Physical layer measurements (Release 15)", Nov. 2017.
TSG-RAN WG2, "Presentation of specification/ Report to TSG:TS 38.300, version 2.0.0.", 3GPP TSG-RAN WG2 Meeting#78 RP-172496, Dec. 18-21, 2017, Lisbon, Portugal.
RAN WG2, "Presentation of specification/ Report to TSG:TS 38.321, version 2.0.0.", 3GPP TSG-RAN WG2 Meeting#78 RP-172419, Dec. 18-21, 2017, Lisbon, Portugal.
RAN 2, "Presentation of specification/ Report to TSG:TS 38.322, version 2.0.0.", 3GPP TSG-RAN WG2 Meeting#78 RP-172322, Dec. 18-21, 2017, Lisbon, Portugal.
TSG-RAN WG2, "Presentation of specification/ Report to TSG:TS 38.323, version 2.0.0.", 3GPP TSG-RAN WG2 Meeting#78 RP-172335, Agenda item 9.2.1., Dec. 18-21, 2017, Lisbon, Portugal.
3GPP TS 38.331 V0.4.0, "3rd Generation Partnership Project; Technical Specification Group Radio Access Network; NR; Radio Resource Control (RRC); Protocol specification (Release 15)", Dec. 2017.
NEC, "Presentation of specification/ Report to TSG:TS 38.401, version 1.0.0.", 3GPP TSG-RAN WG2 Meeting#78 RP-172545, Agenda item 9.2.1., Dec. 18-21, 2017, Lisbon, Portugal.
Nokia, "TS 38.410 v.0.6.0.", 3GPP TSG-RAN WG3 Meeting #98 R3-175055, Agenda item 10.11.4, Nov. 27-Dec. 1, 2017, Reno, USA.
Nokia, "TS 38.413 v.0.5.0. covering agreements of RAN3 #98", 3GPP TSG-RAN WG3 Meeting #98 R3-175056, Agenda item 10, Nov. 27-Dec. 1, 2017, Reno, USA.
QUALCOMM Incorporated, "TS 38.420 baseline", 3GPP TSG-RAN WG3 Meeting #98 R3-175057, Agenda item 10.11.4, Nov. 27-Dec. 1, 2017, Reno, USA.
Ericsson, "TS 38.423 v.0.4.0. covering agreements of RAN3 #98", 3GPP TSG-RAN WG3 Meeting #98 R3-175058, Agenda item 10, Nov. 27-Dec. 1, 2017, Reno, NV, USA.
Huawei, "Presentation of specification to TSG:TS 38.470, version 1.0.0.", 3GPP TSG-RAN WG2 Meeting#78 RP-172286, Agenda item 9.2.1., Dec. 18-21, 2017, Lisbon, Portugal.
Huawei, "Presentation of specification to TSG:TS 38.473, version 1.0.0.", 3GPP TSG-RAN Meeting#78 RP-172287, Agenda item 9.2.1., Dec. 18-21, 2017, Lisbon, Portugal.
Notice of Reasons for Refusal issued by the Japan Patent Office for corresponding Japanese Patent Application No. 2022-200045, dated Sep. 26, 2023, with an English machine translation.

\* cited by examiner

TRANSMISSION DEVICE, WIRELESS COMMUNICATION METHOD, WIRELESS COMMUNICATION SYSTEM, AND RECEPTION DEVICE

CROSS-REFERENCE TO RELATED APPLICATION

This application is a continuation application of U.S. application Ser. No. 16/992,044 filed on Aug. 12, 2020, now pending, which is a continuation application of International Application PCT/JP2018/005189 filed on Feb. 15, 2018 and designated the U.S., the entire contents of each are incorporated herein by reference.

FIELD

The present disclosure relates to a transmission device, a wireless communication method, a wireless communication system, and a reception device regarding ultra-reliable and low-latency communications.

BACKGROUND

In recent years, to achieve further increase in speed and capacity or the like of wireless communication (which can also be called mobile communication), assuming various use cases for wireless communication systems (which can also be called mobile communication systems) such as mobile phone systems (cellular systems), next-generation wireless communication technologies are being discussed. For example, in the standardization organization called 3rd generation partnership project (3GPP), specifications of communication standards called long term evolution (LTE) and LTE-advanced (LTE-A) based on an LTE wireless communication technology have already been formulated, and study work is continuously ongoing to expand its functionality. For example, discussion regarding standardization of the fifth-generation mobile communication system (which can also be called 5G system) that implements operation scenarios and technical requirements presented by the International Telecommunication Union Radio Communications Sector (ITU-R).

In a communication standard of a wireless communication system, the specification is generally defined as a protocol stack (which can also be called hierarchical protocol) in which a wireless communication function is divided into a series of layers. For example, a physical layer is defined as a first layer, a data link layer is defined as a second layer, and a network layer is defined as a third layer. In the fourth generation mobile communication system (which can also be called 4G system) such as LTE, the second layer is divided into a plurality of sub-layers, and includes a first sub-layer (packet data convergence protocol (PDCP) layer), a second sub-layer (radio link control (RLC) layer) and a third sub-layer (medium access control (MAC) layer). Furthermore, in the 4G system, the first layer may be called physical (PHY) layer. Furthermore, the third layer may include a radio resource control (RRC) layer.

Each layer in a transmission device of a wireless communication system performs processing compliant with a predetermined protocol such as adding a header to a data block (which can also be called service data unit (SDU)) from an upper layer to generate a protocol data unit (PDU) that is an information unit exchanged between peer processes in a reception device, and transfers the PDU to a lower layer. For example, in the RLC layer in LTE, a PDCP-PDU that is a data block from the PDCP layer as an upper layer is received as an RLC-SDU, and an RLC-PDU is generated by connecting a plurality of RLC-SDUs within a transport block (TB) length notified from a lower layer, or the like. Such an RLC-PDU is transferred to the MAC layer as a lower layer in a state where an RLC header having a sequence number (SN) in the RLC layer is added.

Each layer in the reception device of the wireless communication system receives a data block (which can also be called PDU) from a lower layer, and transfers a data block (which can also be called SDU), which is taken by removing a header and the like, to an upper layer. For example, in the RLC layer in LTE, processing such as reassembly of a plurality of RLC-PDUs stored in one RLC-PDU is performed by referring to the RLC header attached to the data block (which can also be called MAC-SDU or RLC-PDU) from the MAC layer as a lower layer, and RLC-SDU is transferred to the PDCP layer as an upper layer. At that time, to compensate the order of RLC-SDU for the upper layer, in-order processing based on an RLC sequence number included in the RLC header is performed in the reassembly of the RLC-SDU. Then, in a case where missing of the RLC sequence number is detected, RLC retransmission control for requesting the retransmission of RLC-PDU to the transmission device is executed. It is being discussed that the 5G system also basically follows the above-described protocol stack in the 4G system.

By the way, in the next-generation mobile communication systems of 5G and subsequent generation, services requiring a different level of low latency from the conventional systems, such as tactile communication or augmented reality, are expected to appear. To realize such services, ultra-reliable and low-latency communications (URLLC) is one of functional requirements in the 5G system. URLLC aims to reduce a radio unit delay of a user plane in uplink and downlink to 0.5 ms. This corresponds to less than $\frac{1}{10}$ of the delay required in long term evolution (LTE) that is the 4G system.

Technical Specification Group-Radio Access Network Working Group 2 (TSG-RAN WG2), which is one of working groups of 3GPP, is studying for realizing the ultra-reliable and low-latency communications in the 5G system. In LTE, in a case of transmitting an uplink signal from a wireless terminal (user equipment (UE)), the wireless terminal transmits a scheduling request (SR) signal for requesting radio resource allocation for the uplink signal to a wireless base station, receives a grant signal from the wireless base station as a response, takes out one or more RLC-PDUs by an amount according to a radio resource amount allocated by the grant signal according to predetermined priority control, attaches an MAC header to and connects each of the taken RLC-PDUs, thereby generating a transport block (TB) that is a transmission unit, for example. On the other hand, in the ultra-reliable and low-latency communications in the 5G system, reduction of delay time by omitting a series of sequences regarding scheduling requests has just begun to be discussed.

Examples of the related art include 3GPP TS 36.211 V14.4.0 (2017 September), 3GPP TS 36.212 V14.4.0 (2017 September), 3GPP TS 36.213 V14.4.0 (2017 September), 3GPP TS 36.300 V14.4.0 (2017 September), 3GPP TS 36.321 V14.4.0 (2017 September), 3GPP TS 36.322 V14.1.0 (2017 September), 3GPP TS 36.323 V14.4.0 (2017 September), 3GPP TS 36.331 V14.4.0 (2017 September), 3GPP TS 36.413 V14.4.0 (2017 September), 3GPP TS 36.423 V14.4.0 (2017 September), 3 GPP TS 36.425 V14.0.0 (2017 March), 3GPP TS 37.340 V2.0.0 (2017 December), 3GPP TS 38.201

V1.1.0 (2017 November), 3GPP TS 38.202 V1.1.0 (2017 November), 3GPP TS 38.211 V1.2.0 (2017 November), 3GPP TS 38.212 V1.2.0 (2017 November), 3GPP TS 38.213 V1.2.0 (2017 November), 3 GPP TS 38.214 V1.2.0 (2017 November), 3GPP TS 38.215 V1.2.0 (2017 November), 3GPP TS 38.300 V2.0.0 (2017 December), 3GPP TS 38.321 V2.0.0 (2017 December), 3GPP TS 38.322 V2.0.0 (2017 December), 3GPP TS 38.323 V2.0.0 (2017 December), 3GPP TS 38.331 V0.4.0 (2017 December), 3GPP TS 38.401 V1.0.0 (2017 December), 3GPP TS 38.410V 0.6.0 (2017 December), 3GPP TS 38.413 V0.5.0 (2017 December), 3GPP TS 38.420 V0.5.0 (2017 December), 3GPP TS 38.423 V0.5.0 (2017 December), 3GPP TS 38.470 V1.0.0 (2017 December), 3GPP TS 38.473 V1.0.0 (2017 December), 3GPP TR 38.801 V14.0.0 (2017 April), 3GPP TR 38.802 V14.2.0 (2017 September), 3GPP TR 38.803 V14.2.0 (2017 September), 3GPP TR 38.804 V14.0.0 (2017 April), 3GPP TR 38.900 V14.3.1 (2017 July), 3GPP TR 38.912 V14.1.0 (2017 June), 3GPP TR 38.913 V14.3.0 (2017 June), ITU-R: "IMT Vision-Framework and overall objectives of the future development of IMT for 2020 and beyond", Recommendation ITU-R M.2083-0, September 2015, <http://www.itu.int/dms_pubrec/itu-r/rec/m/R-REC-M.2083-0-201509-I!!PDF-E.pdf>, and Qualcomm: "On reliable transmission of URLLC data" 3GPP TSG-RAN WG2 #99 bis, R2-1709125, 11 Aug. 2017, <http://www.3gpp.org/FTP/tsg_ran/WG2_RL2/TSGR2_99/Docs/R2-1709125.zip>

SUMMARY

According to an aspect of the embodiments, provide is a transmission device including: a communication circuit configured to wirelessly communicate with a reception device, by using a plurality of wireless services including a first wireless service having a first priority and a second wireless service having a second priority that is a priority lower than the first priority; and a processing circuit configured to perform, in accordance with a first information element, allocating of an uplink radio resource to transmission data of the first wireless service, the allocating of the uplink radio resource being performed in a situation, the situation being a situation that a medium access control-protocol data unit (MAC-PDU) has been generated or can be generated in response to allocating the uplink radio resource to a transmission data of the second wireless service, the first information element indicating a value configured to control logical channel prioritization (LCP) procedure.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENT(S)

Figure 1:
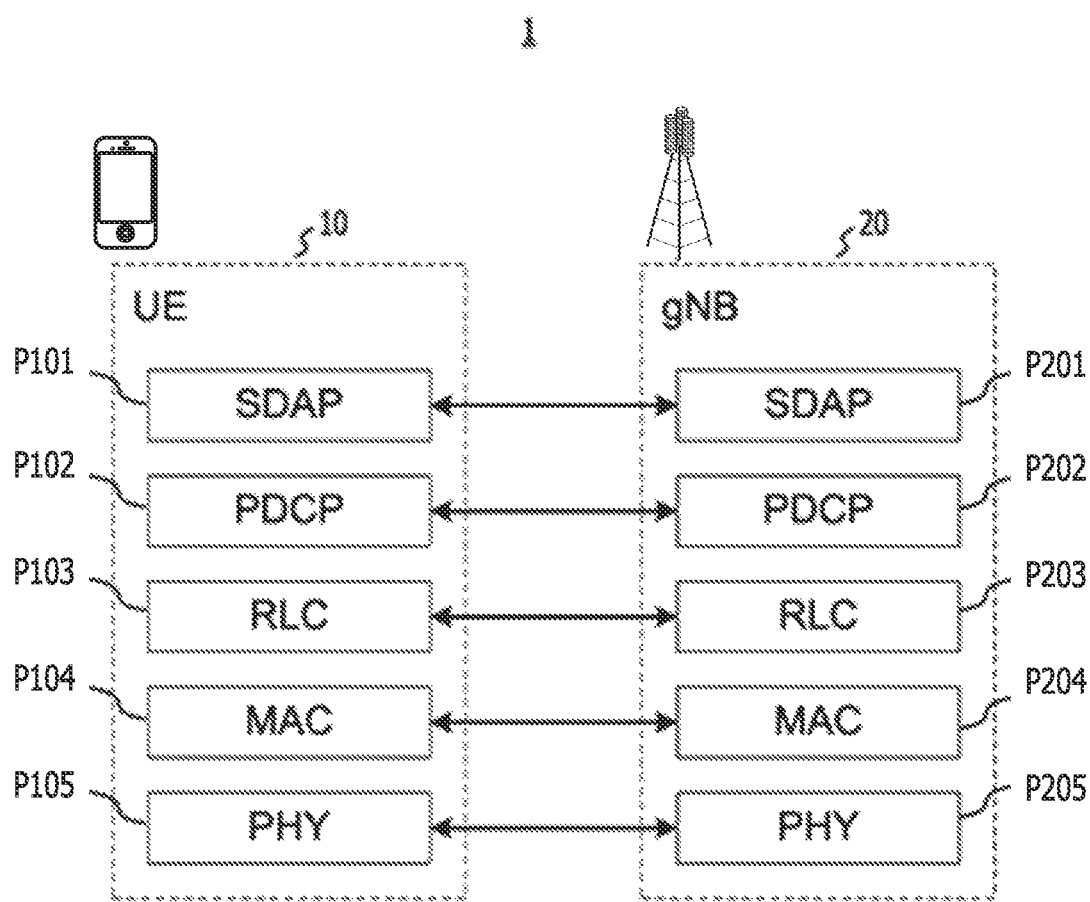
FIG. 1 is a schematic diagram of a U-Plane protocol stack in a wireless communication system 1 according to Example 1.

The above discussion in the 5G system has just begun, and basic system design will be mainly discussed for the time being. Therefore, sufficient study has not been performed for the technologies that will be appropriately implemented in an operator. For example, uplink ultra-reliable and low-latency communications have not been studied yet, and discussion about implementation issues has not been progressed enough.

According to an aspect of the disclosure, provided is a solution to alleviate a circumstance that may occur in realizing the ultra-reliable and low-latency communications.

In an example, a delay in transmitting an uplink signal may be further reduced, and the ultra-reliable and low-latency communications may be implemented.

As described above, discussion about the 5G system has just begun. For example, uplink ultra-reliable and low-latency communications (URLLC) have not been studied yet, and discussion about implementation issues has not been progressed enough.

The inventors of the present disclosure has found, as a result of their own study about the implementation issues that may occur in the case of executing uplink URLLC, an inconvenience that a delay occurs due to storing in a buffer of uplink transmission data that has occurred after a radio resource allocation amount is determined until the next radio resource allocation timing.

For example, a wireless terminal (UE) can determine the uplink radio resource allocation amount by referring to a radio resource allocation amount indicated in a grant signal received from a wireless base station. The UE executes processing (which can also be called priority control processing) of logical channel prioritization (LCP) control (which can also be called logical channel prioritization) when executing new transmission using an allocated radio resource. In LCP, a radio resource is allocated according to a priority of each logical channel in which data is available in the buffer. In other words, the UE excludes a logical channel in which data is not available in the buffer at the time of executing LCP from a radio resource allocation target.

As a result, even if new data is added to the buffer after LCP is executed, the logical channel to which a radio resource has not been allocated at the time of executing LCP waits until the next radio resource allocation timing. This similarly applies to a case where a series of sequences regarding scheduling request is omitted.

The inventors of the present disclosure have reached the unique finding that if the above-described technical restrictions are similarly applied to a wireless service that requires an extremely low latency such as URLLC, such application may become an obstacle in implementing wireless services such as the ultra-reliable and low-latency communications. Note that an event similar to the above may occur even in downlink.

Hereinafter, modes for carrying out the present disclosure (hereinafter, also referred to as embodiments or examples) will be described with reference to the drawings. Structures of examples to be described below are examples for embodying the technical idea of the present disclosure, and it is not intended that the present disclosure is limited to the structures of these examples and are equally applicable to other embodiments within the scope of the claims. For example, names of various layers such as PDCP, RLC, and MAC can be changed in future 5G system specification development. The names of the each layers can also be changed in the mobile communication systems of the sixth and subsequent generation. Note that in the following disclosure, the names of layers such as PDCP, RLC, and MAC are used as examples of layers in a protocol stack for wireless communication but it is not intended to limit names to these names of layers.

Furthermore, it also goes without saying that the respective embodiments described below may be implemented in appropriate combination. Here, the entire contents of Non-Patent Documents 1 to 40 are incorporated herein by reference.

<Example 1> In a wireless communication system 1 according to Example 1, uplink radio resource allocation is permitted for transmission data that has occurred after LCP processing in a wireless terminal (UE) 10 is executed. Thereby, a delay in the uplink data transmission in the UE 10 can be reduced.

FIG. 1 is a schematic diagram of a user plane (U-Plane) protocol stack in the wireless communication system 1 according to Example 1. Note that names of each layers are examples, and the names can be changed in specification development for 5G and subsequent systems.

The wireless communication system 1 illustrated in FIG. 1 includes the wireless terminal (UE) 10 and a wireless base station (gNB) 20. When focusing on an uplink in the wireless communication system 1 in FIG. 1, the UE 10 comprises a transmission device, and the gNB 20 comprises a reception device. Furthermore, when focusing on a downlink in the wireless communication system 1 in FIG. 1, the UE 10 comprises a reception device, and the gNB 20 comprises a transmission device.

The UE 10 includes a service data adaptation protocol (SDAP) layer P101, a packet data convergence protocol (PDCP) layer P102, a radio link control (RLC) layer P103, a medium access control (MAC) layer P104, and a physical (PHY) layer P105. The SDAP layer P101, the PDCP layer P102, the RLC layer P103, and the MAC layer P104 can be classified into sub-layers of a second layer. The PHY layer P105 can be classified into a first layer.

The gNB 20 has layers paired with the layers of the UE 10, and includes, for example, a service data adaptation protocol (SDAP) layer P201, a packet data convergence protocol (PDCP) layer P202, a radio link control (RLC) layer P203, a medium access control (MAC) layer P204, and a physical (PHY) layer P205. The SDAP layer P201, the PDCP layer P202, the RLC layer P203, and the MAC layer P204 can be classified into sub-layers of the second layer. The PHY layer P205 can be classified into the first layer.

In the wireless communication system 1 illustrated in FIG. 1, in a case where an IP packet is transmitted from the UE 10 in uplink, for example, the IP packet from an upper layer is processed in order of the SDAP layer P101, the PDCP layer P102, the RLC layer P103, the MAC layer P104, and the PHY layer P105, for example, and transmitted as an uplink wireless signal. In this case, in the gNB 20 of the wireless communication system 1, the uplink wireless signal from the UE 10 is processed in order of the PHY layer P205, the MAC layer P204, the RLC layer P203, the PDCP layer P202, and the SDAP layer P201, for example, and the IP packet from the UE 10 is acquired.

Detailed description of each layer in the U-Plane protocol stack is given in Non-Patent Documents 1 to 40. Note that the function that each layer should have can be changed depending on the development of the discussion about the standardization of the 5G system.

Figure 2:
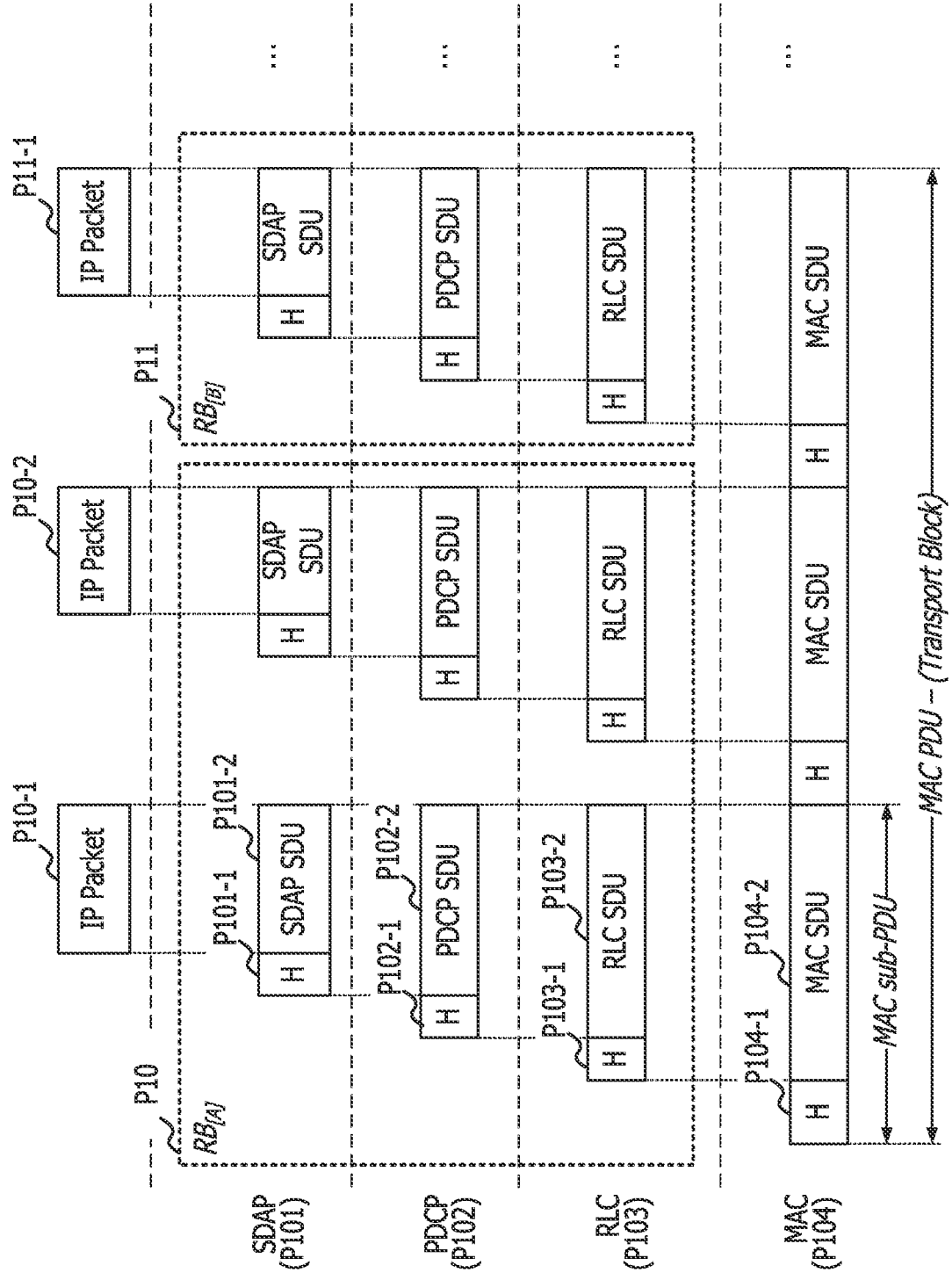
FIG. 2 is a diagram illustrating a relationship between SDU and TB of the U-Plane protocol stack in the wireless communication system 1 according to Example 1.

FIG. 2 is a diagram illustrating a relationship between an SDU and a TB of the U-Plane protocol stack in the wireless communication system 1 according to Example 1. FIG. 2 illustrates a radio bearer RB[A](P10) and a radio bearer RB[B](P11). The radio bearer RB[A](P10) and the radio bearer RB[B](P11) are examples of radio bearers for user data, and may also be called data radio bearer (DRB).

In FIG. 2, an IP packet P10-1 and an IP packet P10-2 are associated (mapped) with respect to the radio bearer RB[A] (P10), and an IP packet P11-1 is mapped with respect to the radio bearer RB[B](P11).

For example, in the case of the uplink U-Plane protocol stack in the UE 10, the IP packet P10-1 such as an application from the upper layer is input to the SDAP layer P101. The SDAP layer P101 receives the IP packet P10-1 from the upper layer as an SDAP-SDU (P101-2), adds a header (SDAP header) P101-1 including an identifier (QoS flow ID (QFI)) indicating a quality of service (QoS) flow and the like to generate SDAP-PDUs (P101-1 and P101-2), and transfers the SDAP-PDUs (P101-1 and P101-2) to the PDCP layer P102. Note that the configuration of the SDAP-PDUs (P101-1 and P101-2) is described in detail in 3GPP TS37.324, for example.

The PDCP layer P102 receives the SDAP-PDUs (P101-1 and P101-2) from the SDAP layer P101 as a PDCP-SDU (P102-2), adds a PDCP header P102-1 to generate PDCP-PDUs (P102-1 and P102-2), and transfers the PDCP-PDUs (P102-1 and P102-2) to the RLC layer P103. Note that the configuration of the PDCP-PDUs (P102-1 and P102-2) is described in detail in 3GPP TS38.323, for example.

The RLC layer P103 receives the PDCP-PDUs (P102-1 and P102-2) from the PDCP layer P102 as an RLC-SDU (P103-2), adds an RLC header P103-1 to generate RLC-PDUs (P103-1 and P103-2), and transfers the RLC-PDUs (P103-1 and P103-2) to the MAC layer P104. Note that the configuration of the RLC-PDUs (P103-1 and P103-2) is described in detail in 3GPP TS38.322, for example.

The MAC layer P104 stores the RLC-PDUs (P103-1 and P103-2) from the RLC layer P103 in the buffer for each radio bearer (RB[A](P10) and RB[B](P11)). In the MAC layer P104, the radio bearers (RB[A](P10) and RB[B](P11)) may be distinguished by a logical channel identifier (LCID). In other words, the RLC-PDUs (P103-1 and P103-2) from the RLC layer P103 is stored as a MAC-SDU (P104-2) in the buffer for each logical channel identified by the LCID.

The MAC layer P104 executes processing regarding new transmission of data (MAC-SDU) stored in the buffer when the radio resource allocation amount in uplink is determined. For example, the MAC layer P104 executes logical channel prioritization control (LCP). In LCP, a logical channel that becomes a radio resource allocation target is selected in order of priority set in advance for each logical channel (or may be for each radio bearer). The MAC layer P104 acquires the MAC-SDU (P104-2) from the buffer of the logical channel selected according to LCP, and adds a MAC sub-header P104-1 thereto to generate MAC sub-PDUs (P104-1 and P104-2). In the example of FIG. 2, MAC sub-PDUs corresponding to the IP packet P10-1, the IP packet P10-2, and the IP packet P11-1 are generated, and a MAC-PDU (may also be called transport block (TB)) including the three MAC sub-PDUs is generated. Note that the configurations of the MAC-PDU and the MAC sub-PDU, and an LCP algorithm are described in detail in 3GPP TS38.321, for example.

Figure 3:
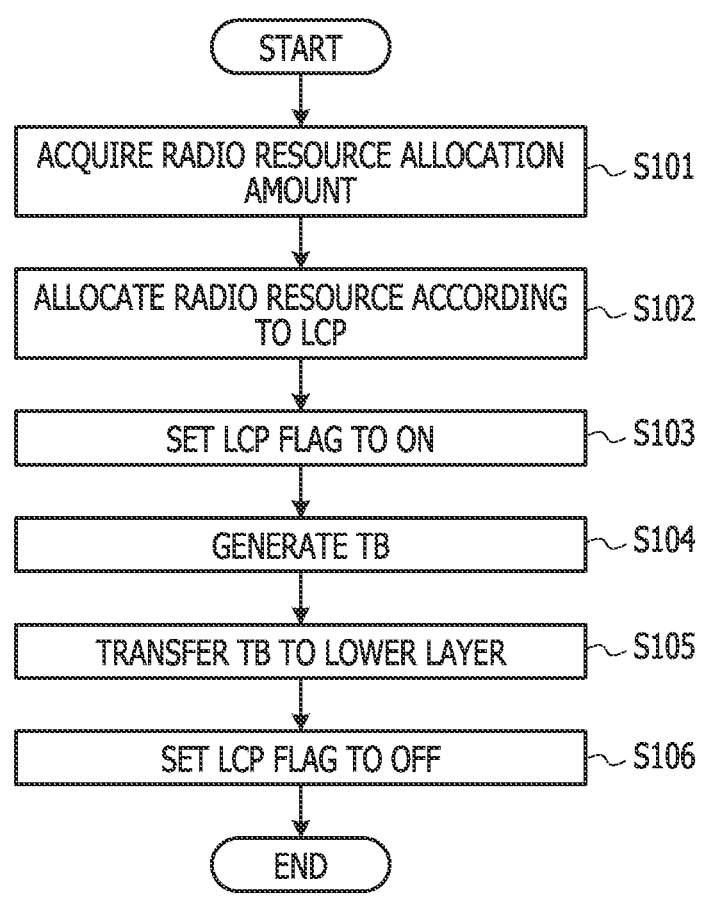
FIG. 3 is a diagram illustrating an example of a flow of first processing of a UE 10 in the uplink U-Plane protocol stack.

FIG. 3 is a diagram illustrating an example of a flow of first processing of the UE 10 in the uplink U-Plane protocol stack. In the first processing illustrated in FIG. 3, determination of the uplink radio resource allocation amount may be adopted as one of triggers for starting execution, for example. For example, the UE 10 may execute the first processing illustrated in FIG. 3 by transmitting a scheduling request (SR) for requesting uplink radio resource allocation and receiving an uplink transmission permission signal (which can also be called uplink grant) indicating the uplink radio resource allocation amount from the gNB 20, thereby determining the uplink radio resource allocation amount. Such a radio resource allocation scheme can also be called dynamic scheduling. Alternatively, the UE 10 determines the uplink radio resource allocation amount on the basis of a periodicity and allocation amount notified in advance from the gNB 20, and may execute the first processing illustrated in FIG. 3. Such a radio resource allocation scheme can also be called persistent scheduling or semi-persistent scheduling.

The UE 10 acquires the uplink radio resource allocation amount (S101) and executes radio resource allocation according to LCP (S102). In S102, the UE 10 selects the logical channel that becomes a radio resource allocation target in order of priority set in advance for each logical channel (or may be for each radio bearer), and generates a MAC sub-PDU including transmission data (MAC-SDU) acquired from the buffer of the selected logical channel. Then, the UE 10 selects another logical channel on the basis of LCP if the radio resource allocation amount is still available, and generates a MAC sub-PDU including transmission data (MAC-SDU) acquired from the buffer of the selected logical channel. Note that, in S102, a MAC sub-header corresponding to the MAC-SDU may be or may not be added to the generated MAC sub-PDU. In other words, in generation of a TB (S104) to be described below, the MAC sub-header may be added to each MAC sub-PDU included in the TB.

Figure 4:
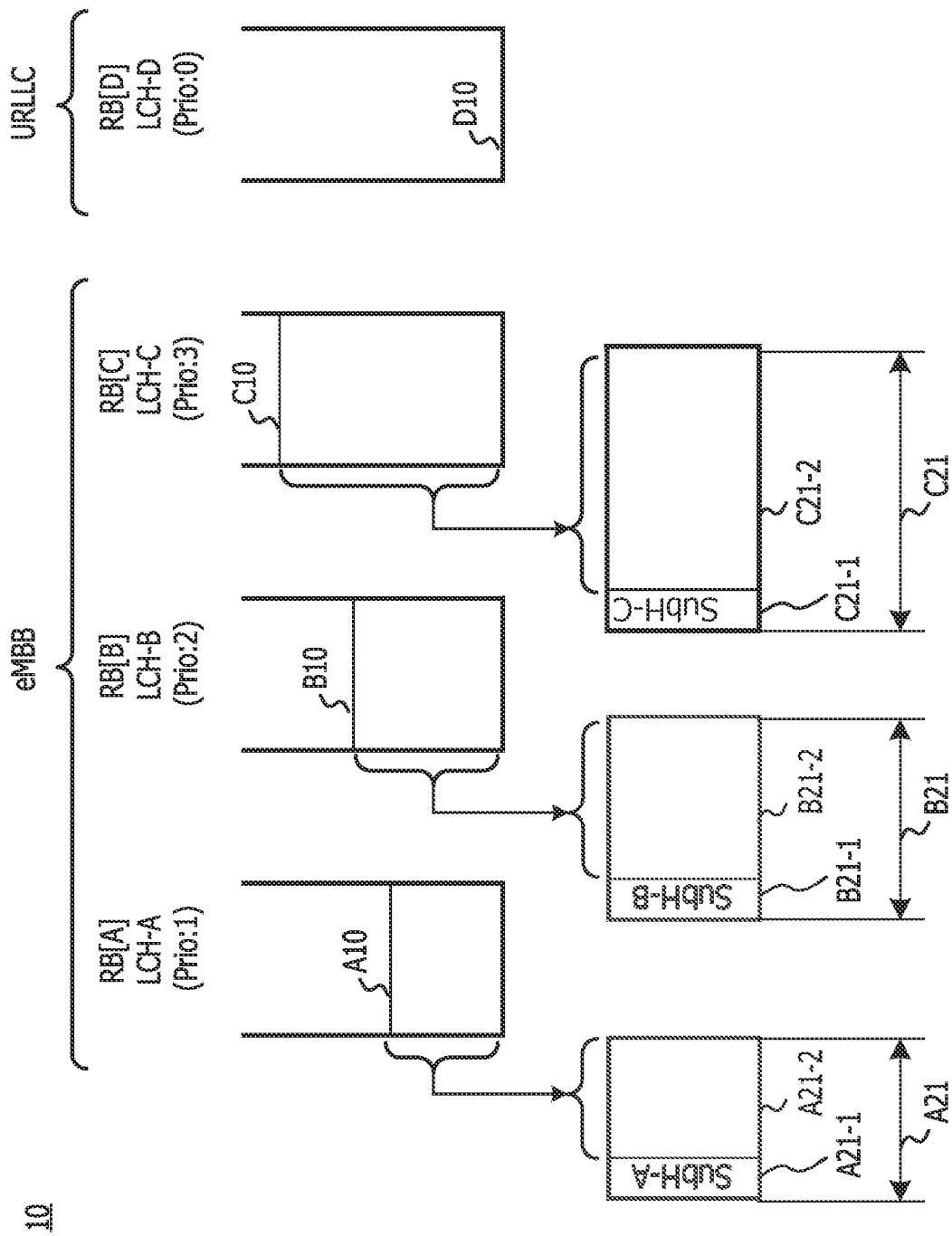
FIG. 4 is a diagram (part 1) illustrating an example of uplink radio resource allocation in the UE 10 according to Example 1.

FIG. 4 is a diagram illustrating an example (part 1) of the uplink radio resource allocation in the UE 10 according to Example 1. The example in FIG. 4 illustrates a buffer A10, a buffer B10, a buffer C10, and a buffer D10, which correspond to a radio bearer RB[A] (logical channel LCH-A), a radio bearer RB[B] (logical channel LCH-B), a radio bearer RB[C] (logical channel LCH-C), and radio bearer RB[D] (logical channel LCH-D), respectively. The logical channel LCH-A is set to the priority "1", and the logical channel LCH-B, logical channel LCH-C, and logical channel LCH-D are set to the priority "2", the priority "3", and the priority "0", respectively. Note that, in the present example, the priority is higher as the value of the priority is smaller. For example, the radio bearer RB[A] (logical channel LCH-A), the radio bearer RB[B] (logical channel LCH-B), and the radio bearer RB[C] (logical channel LCH-C) are associated with the use of enhanced mobile broadband (eMBB) indicating a high-speed and large-capacity wireless service, and the radio bearer RB[D] (logical channel LCH-D) is associated with the use of ultra-reliable and low latency communications (URLLC) indicating a ultra-reliable and low latency wireless service. According to 3GPP TR38.913, 0.5 ms (milliseconds) is aimed at in URLLC, as the delay in U-Plane in both uplink and downlink, and 4 ms (milliseconds) is aimed at in eMBB. Therefore, the radio bearer RB[D] (logical channel LCH-D) associated with the use of URLLC should be set to the priority "0" indicating processed with the highest priority, as in the example illustrated in FIG. 4, but the present example is not limited thereto. For example, a value indicating a relatively high priority in relation to the plurality of radio bearers (radio bearer RB[A], radio bearer RB[B], and radio bearer RB[C]) used for transmitting user data may be set to the radio bearer RB[D]. Note that URLLC is an example of a first wireless service having a higher priority (which can also be called first priority) than other wireless services, and eMBB is an example of a second wireless service having a priority (which can also be called second priority) lower than the first wireless service.

In FIG. 4, the radio bearer RB[D] (logical channel LCH-D) has the highest priority "0", but no transmission data is stored in the buffer D10 corresponding to the radio bearer RB[D]. Therefore, in the example in FIG. 4, uplink radio resource allocation to the radio bearer RB[D] is not performed, and uplink radio resources are allocated to the radio bearer RB[A] (priority: 1), the radio bearer RB[B] (priority: 2), and the radio bearer RB[C] (priority: 3) in order of priority. As a result, a MAC sub-PDU (A21) including a MAC-SDU (A21-2) acquired from the buffer A10 of the radio bearer RB[A], a MAC sub-PDU (B21) including a MAC-SDU (B21-2) acquired from the buffer B10 of the radio bearer RB[B], and a MAC sub-PDU (C21) including a MAC-SDU (C21-2) acquired from the buffer C10 of the radio bearer RB[C] are generated. Note that, in the example in FIG. 4, a mode in which the MAC sub-PDUs (A21, B21, and C21) include respective MAC sub-headers (A21-1, B21-1, and C21-1) is illustrated. However, as described above, at the time of S102, the MAC sub-headers (A21-1, B21-1, and C21-1) may not be added to the MAC sub-PDUs (A21, B21, and C21).

The description returns to FIG. 3. The UE 10 sets an LCP flag to ON (S103). S103 may be executed after completion of S102, may be executed at the same time as the start of execution of S102, or may be executed at appropriate timing during execution of S102. In S103, the UE 10 may set the LCP flag to "1". In this case, the value of the LCP flag being "1" means that the LCP flag is ON. Note that the specific example of the value of the LCP flag is not limited to this example. Here, the LCP flag has an aspect as a flag indicating whether or not to execute interrupt communication (IC) to be described below. In this aspect, the LCP flag indicating the ON state means that the IC should be executed.

The UE 10 generates a TB (may also be called MAC-PDU) on the basis of the MAC sub-PDU generated in S102 (S104), transfers the TB to the PHY layer P105 as a lower layer (S105), and sets the LCP flag to OFF (S106). When the TB is transferred to the PHY layer P105, the wireless signal generated based on the TB is transmitted from the antenna of the UE 10.

In S106, the UE 10 may set the LCP flag to "0", for example. In this case, the value of the LCP flag being "0" means that the LCP flag is OFF. Note that the specific example of the value of the LCP flag is not limited to this example. Here, the LCP flag has an aspect as a flag indicating whether or not to execute IC. In this aspect, the LCP flag indicating the OFF state means that the IC should not be executed. In the example in FIG. 3, S106 is illustrated after S105, but the present disclosure is not limited to this order. For example, S106 may be executed before S105 or may be executed in parallel with S105.

Figure 5:
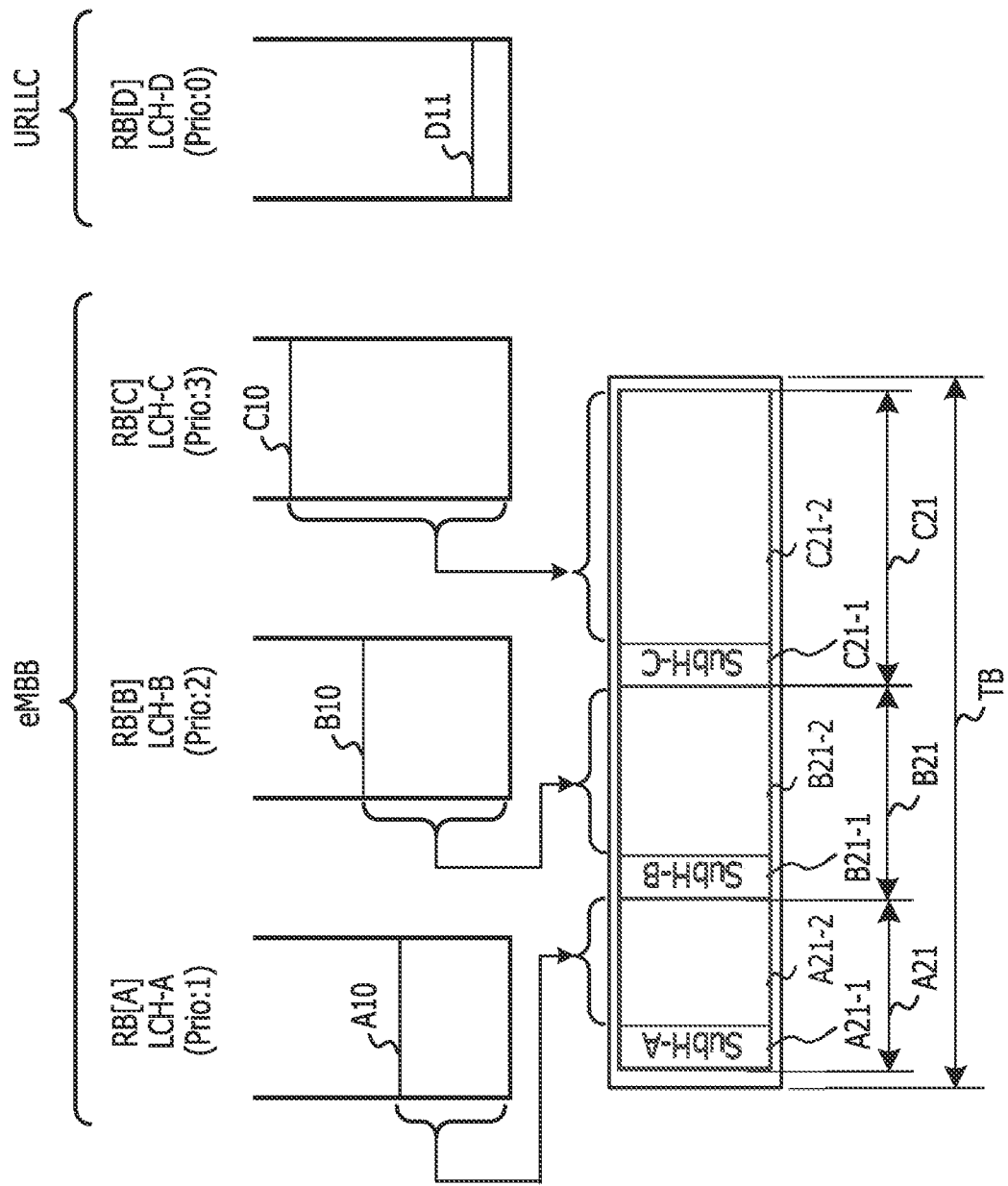
FIG. 5 is a diagram (part 2) illustrating an example of uplink radio resource allocation in the UE 10 according to Example 1.

FIG. 5 is a diagram illustrating an example (part 2) of the uplink radio resource allocation in the UE 10 according to Example 1. As illustrated in FIG. 5, the UE 10 generates a TB (may also be called MAC sub-PDU) including the MAC sub-PDUs (A21, B21, and C21) generated from the data in the buffers (A10, B10, and C10) of the logical channels (LCH-A, LCH-B, and LCH-C) to which radio resources are allocated according to LCP in S102. A MAC sub-header is added to the MAC sub-PDU included in the TB. In a case where the MAC sub-header is not added to the MAC sub-PDU in S102, the UE 10 may execute processing of adding the MAC sub-header to the MAC sub-PDU in S104. The TB illustrated in FIG. 5 may further include information elements other than the MAC sub-PDUs (A21, B21, and C21).

The example in FIG. 5 will be further described. In the example in FIG. 5, uplink radio resources are allocated to the radio bearer RB[A] (logical channel LCH-A), the radio bearer RB[B] (logical channel LCH-B), and the radio bearer RB[C] (logical channel LCH-C), and an uplink radio resource is not allocated to the radio bearer RB[D] (logical channel LCH-D). The reason is that, as illustrated in FIG. 4, transmission data has not been stored in the buffer D10 of the radio bearer RB[D] (logical channel LCH-D) at the time of executing S102. However, at the time when execution of S104 is started or when execution of S104 is completed, transmission data is stored in a buffer D11 of the radio bearer RB[D] (logical channel LCH-D), as illustrated in FIG. 5. Note that the buffer D11 of the radio bearer RB[D] (logical channel LCH-D) illustrated in FIG. 5 is denoted by the different reference numeral from the buffer D10 of the radio bearer RB[D] (logical channel LCH-D) illustrated in FIG. 4, but the buffer D11 may be physically the same memory medium as the buffer D10.

In a conventional wireless communication system (for example, the 4G system), in a case where new transmission data occurs after the processing regarding radio resource allocation is completed, the new transmission data is stored in the buffer until the next radio resource allocation timing, and a delay occurs by that amount of time. In contrast, the UE 10 according to the present example permits interrupt communication (IC) of the new transmission data, thereby reducing the delay in the new transmission data.

Figure 6:
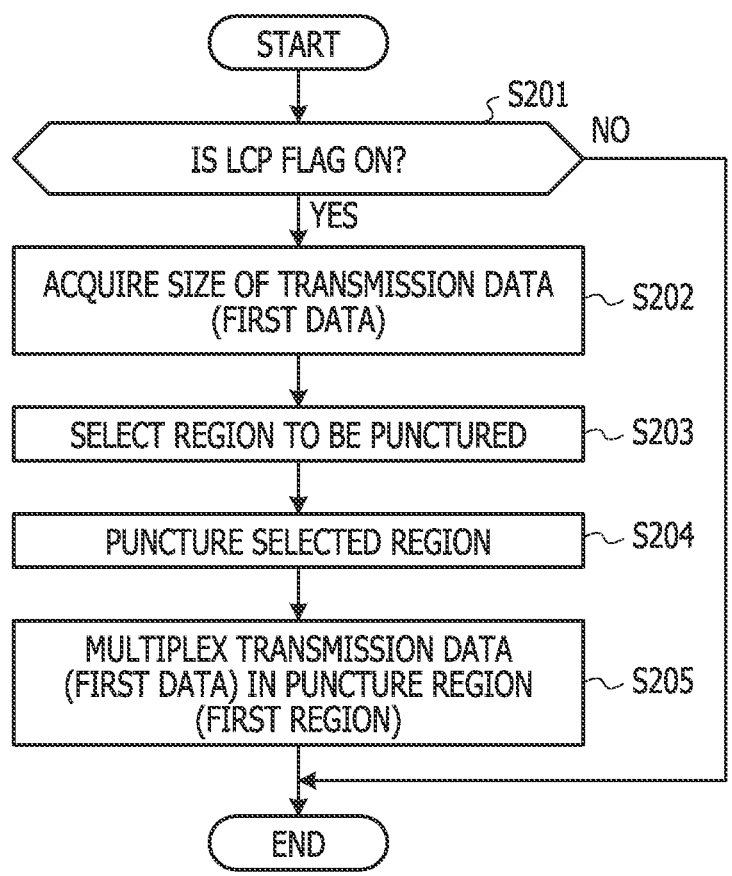
FIG. 6 is a diagram illustrating an example of a flow of second processing of the UE 10 in the uplink U-Plane protocol stack.

FIG. 6 is a diagram illustrating an example of a flow of second processing of the UE 10 in uplink U-Plane protocol stack. In the second processing illustrated in FIG. 6, availability of the new transmission data in the buffer of the radio bearer (logical channel) associated with the target wireless service (may also be called first wireless service) for interrupt communication may be adopted as one of triggers for starting execution, for example.

For example, the UE 10 repeatedly checks whether or not new data (MAC-SDU) is stored in the buffer of the radio bearer (which can also be called first radio bearer or first logical channel) associated with the first wireless service, and may execute the second processing illustrated in FIG. 6 in a case where availability of new data in the buffer of the first logical channel is detected. Alternatively, the UE 10 may adopt reception of a notification indicating that a PDU including an IP packet of the first wireless service is generated from any of the SDAP layer P101, the PDCP layer P102, and the RLC layer P103 as one of triggers for starting execution of the second processing illustrated in FIG. 6.

The above-described trigger for executing the second processing may correspond to a case in which the UE 10 receives a grant indicating the radio resource allocation amount for the second radio service from the gNB 20, new transmission data (which can also be called first data) of the first wireless service occurs after the TB including transmission data (which can also be called second data) of the second wireless service is generated according to the grant, and interruption of the first data to the TB including the second data is determined. This similarly applies to the examples to be described below.

Note that the UE 10 may suspend execution of the first processing illustrated in FIG. 3 until the second processing is completed in the case where the UE 10 detects the trigger for starting execution of the second processing illustrated in FIG. 6. In other words, the UE 10 may exclusively execute either one of the first processing illustrated in FIG. 3 and the second processing illustrated in FIG. 6 such that the second processing is preferentially executed.

The description returns to FIG. 6. The UE 10 determines whether or not the LCP flag is ON (S201). In S201, in the case where the value of the LCP flag is "1", for example, the UE 10 may determine that the LCP flag is ON. On the other hand, in the case where the value of the LCP flag is "0", the UE 10 may determine that the LCP flag is OFF. Note that the present disclosure is not limited to these values.

In the case where the second processing illustrated in FIG. 6 is executed within a period from when the LCP flag is set to ON in S103 of the first processing illustrated in FIG. 3 to when the LCP flag is set to OFF in S106 of the first processing, the UE 10 can determine that the LCP flag is ON in S201. On the other hand, in the case where the second processing illustrated in FIG. 6 is executed before the LCP flag is set to ON in S103 of the first processing illustrated in FIG. 3, or after the LCP flag is set to OFF in S106 of the first processing, the UE 10 can determine that the LCP flag is OFF in S201.

In the case where it is determined that the LCP flag is ON in S201 (YES in S201), the UE 10 executes processing regarding IC (S202 to S205) (which can also be called IC processing). For example, the UE 10 acquires the size of the transmission data (that can also be called first data) stored in the buffer of the radio bearer (logical channel) associated with the first wireless service (for example, URLLC) (S202), and selects a region to be punctured (which can also be called first region) from a TB region generated in S104 of the first processing (S203). Here, the first data may be, for example, a MAC-SDU including user data of URLLC. The first region may be part or all of the region allocated to a radio bearer having a low priority among the radio bearers (logical channels) to which radio resources have been allocated in S102. Alternatively, the first region may be a region specified on the basis of the setting information notified in advance from the gNB 20. In other words, the first region may be determined on the basis of the setting information shared in advance by the gNB 20 and the UE 10. Alternatively, the first region may be a region specified by a predetermined position and a predetermined size in the TB region generated in S104 of the first processing. For example, the first region may be a region having a fixed length at the end of the TB region generated in S104. In this case, the fixed length of the first region may be the same as the size of the first data. In other words, the MAC sub-header may be omitted from the first data multiplexed in the fixed-length first region. As a result, the size of the first region can be minimized by at least the amount of omission of the MAC sub-header.

The UE 10 punctures data corresponding to the region (which can also be called first region or puncture region) selected in S203 from the TB data generated in S104 of the first processing (S204), and multiplexes the first data (which can also be called transmission data of the first wireless service) in the puncture region (S205). Note that S204 and S205 may be single processing. In other words, in S205, the UE 10 may overwrite the data corresponding to the first region of the TB data with the first data. In this case, the UE 10 may omit implementing of S204.

As described above, in the case where new first data of the first wireless service is generated within the period from when the LCP flag is set to ON in S103 of the first processing illustrated in FIG. 3 to when the LCP flag is set to OFF in S106 of the first processing, the IC processing for the first data is executed. Therefore, the first data can be transmitted without waiting for the next radio resource allocation timing.

On the other hand, in the case where the UE 10 determines that the LCP flag is OFF in S201 (NO in S201), the UE 10 may skip S202 to S205 and terminate the second processing because a TB in which the first data is to be multiplexed by the IC processing has not been generated yet. In this case, in the first processing illustrated in FIG. 3, a radio resource is allocated to the radio bearer (logical channel) of the first wireless service (S102), a TB including the first data is generated (S104), and the TB including the first data is transferred to the PHY layer P105 as a lower layer (S105), so that the first data is transmitted from the UE 10 to the gNB 20.

Figure 7:
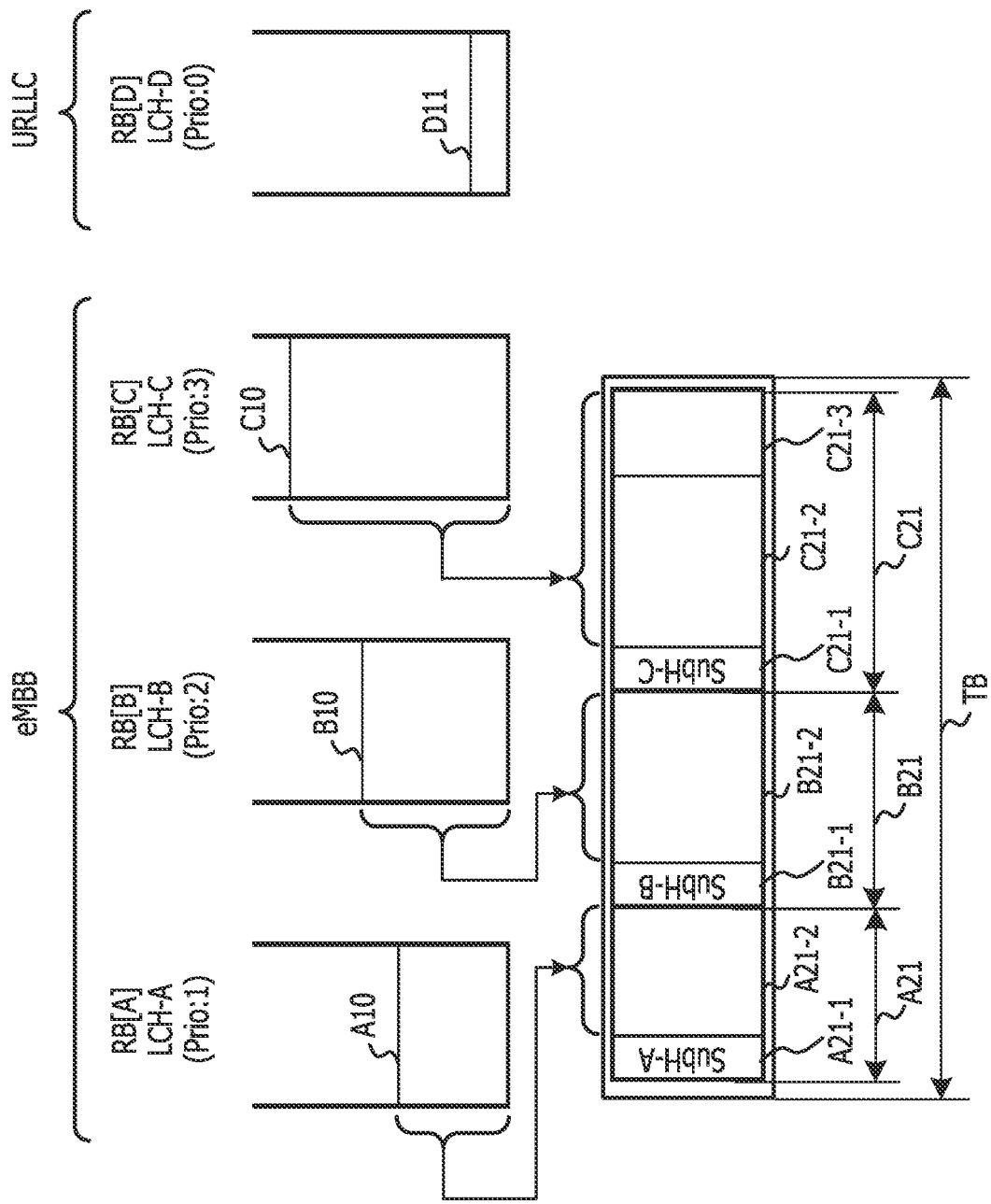
FIG. 7 is a diagram (part 3) illustrating an example of uplink radio resource allocation in the UE 10 according to Example 1.

FIG. 7 is a diagram (part 3) illustrating an example of the uplink radio resource allocation in the UE 10 according to Example 1. In the example in FIG. 7, a partial region C21-3 of the radio bearer RB[C] (logical channel LCH-C) having the priority "3" is selected as the first region. Here, the size of the first region C21-3 may be a fixed length or may be dynamically determined on the basis of the data length of the buffer D11 corresponding to the radio bearer RB[D] (logical channel LCH-D) of the first wireless service (for example, URLLC). Furthermore, the position of the first region C21-3 may be a fixed position defined in the standard or may be a position determined on the basis of the setting information notified in advance from the gNB 20. In other words, the position of the first region C21-3 may be determined on the basis of the setting information shared in advance by the gNB 20 and the UE 10.

Figure 8:
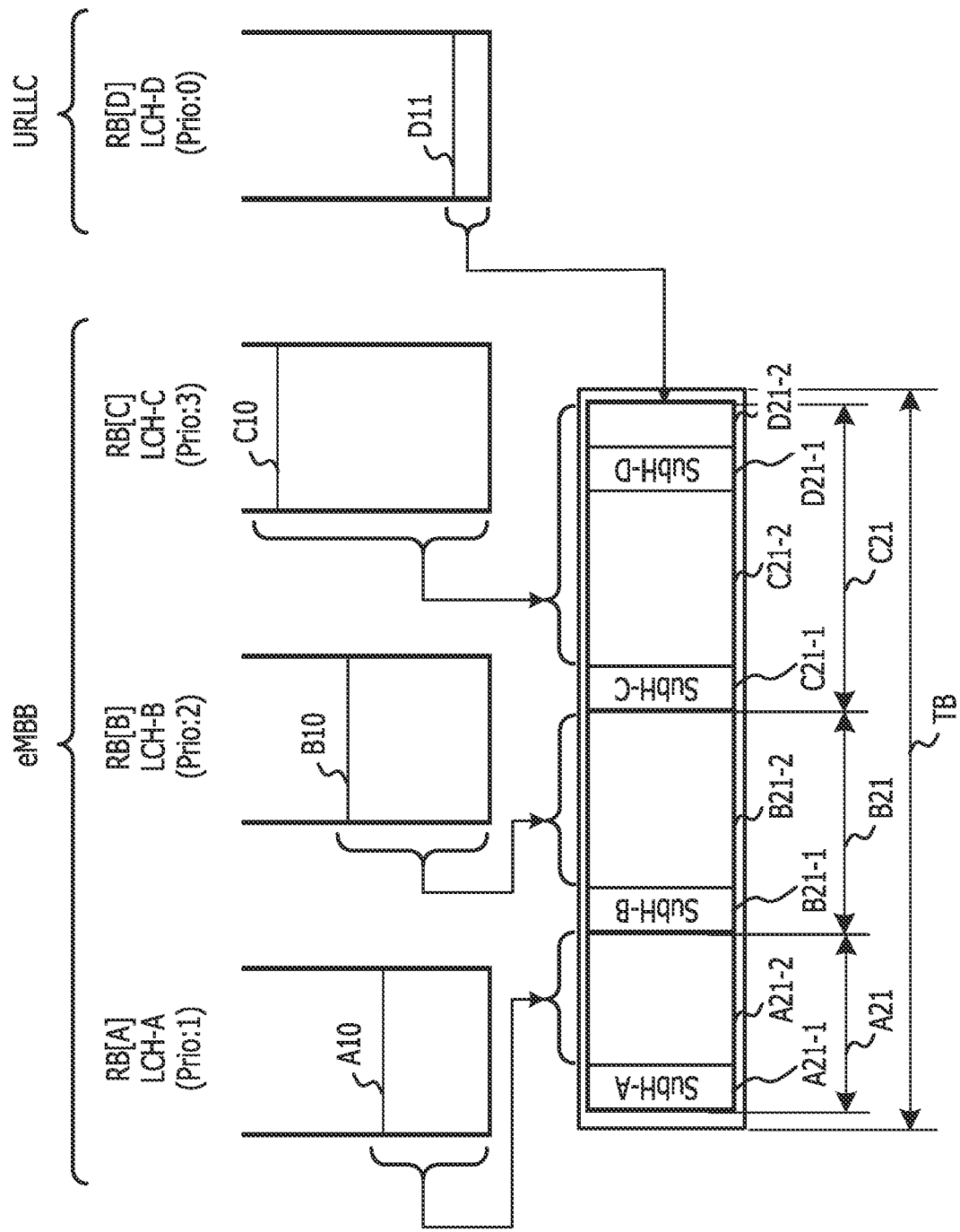
FIG. 8 is a diagram (part 4) illustrating an example of uplink radio resource allocation in the UE 10 according to Example 1.

FIG. 8 is a diagram (part 4) illustrating an example of the uplink radio resource allocation in the UE 10 according to Example 1. In the example in FIG. 8, a MAC sub-PDU including a MAC-SDU (D21-2) including the transmission data (first data) in the buffer D11 corresponding to the radio bearer RB[D] (logical channel LCH-D) of the first wireless service (for example, URLLC) and a MAC sub-header D21-1 (which can also be called MAC sub-header of the first data) are multiplexed in a region corresponding to the first region C21-3 illustrated in FIG. 7. As described above, the MAC sub-header D21-1 of the first data may be omitted.

As illustrated in FIG. 8, the data (first data) of the first wireless service can be multiplexed in a region (which can also be called first region or puncture region) obtained by puncturing part of the MAC sub-PDU in which transmission data corresponding to any radio bearer of another wireless service (which can also be called second wireless service) other than the first wireless service is stored. In the case where the gNB 20 has received the TB having such a configuration, the gNB 20 can acquire the first data of the first wireless service multiplexed in part of the region of the second wireless service. For example, the gNB 20 may specify the region in which the first data is multiplexed according to the setting information notified to the UE 10 in advance. In other words, the gNB 20 may determine the region in which the first data is multiplexed according to the setting information shared in advance by the gNB 20 and the UE 10.

Figure 9:
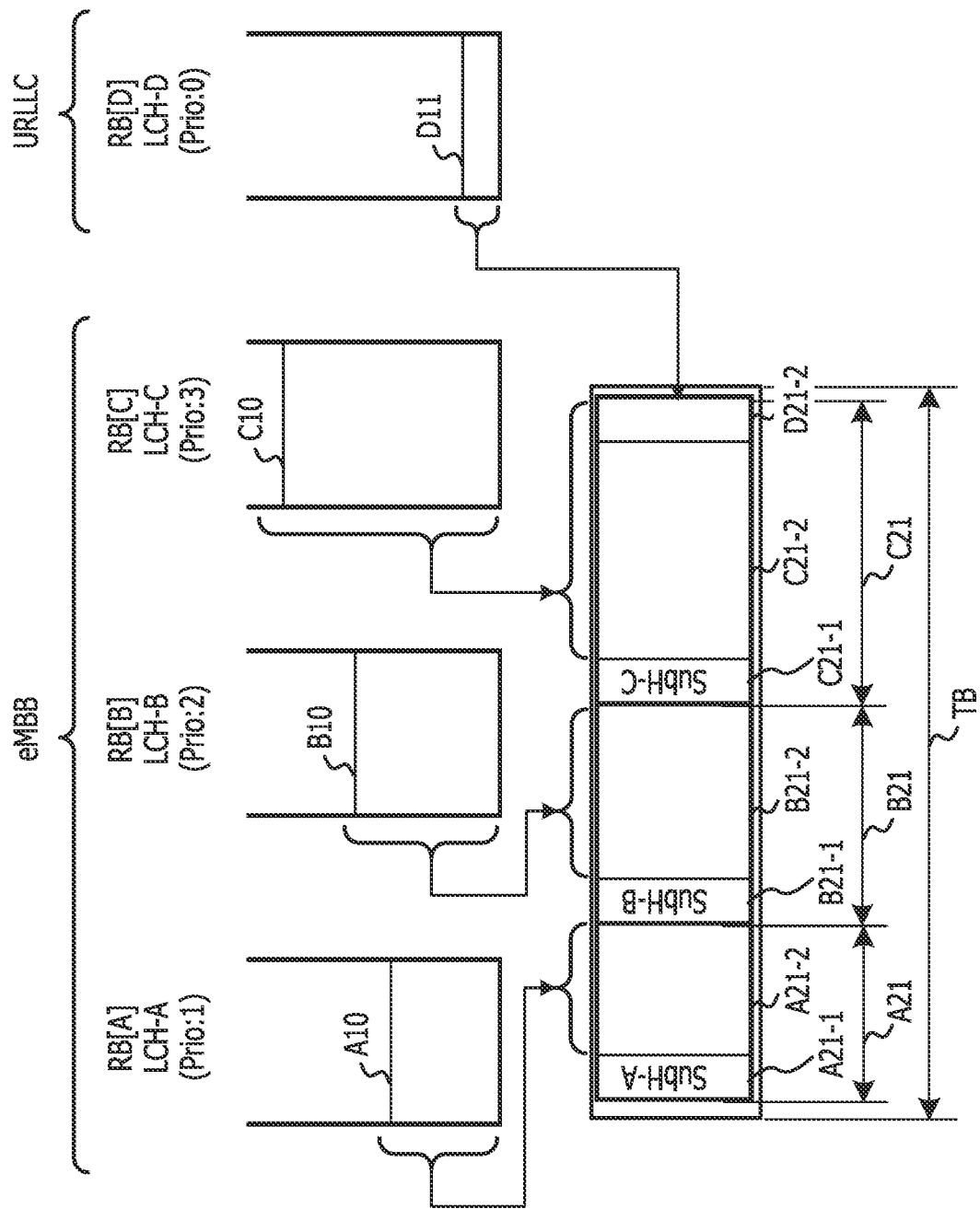
FIG. 9 is a diagram (part 5) illustrating an example of uplink radio resource allocation in the UE 10 according to Example 1.

FIG. 9 is a diagram (part 5) illustrating an example of the uplink radio resource allocation in the UE 10 according to Example 1. In FIG. 9, the MAC sub-header D21-1 of the first data is omitted. Thereby, the region to be punctured (first region C21-3 illustrated in FIG. 7) can be reduced in the MAC sub-PDU (C21). In other words, in the example in FIG. 9, the first region C21-3 in the MAC sub-PDU (C21) is only required to have the region D21-2 in which the first data is multiplexed and may not include the region D21-1 in which the MAC sub-header of the first data is stored. Note that, as illustrated in FIG. 9, the first data D21-2 from which the MAC sub-header is omitted comprises a transparent medium access control (MAC). In other words, omitting the MAC sub-header of the first data D21-2 is equivalent to making the MAC sub-layer transparent for the first data D21-2. Reducing header overhead by omitting the header can contribute to improving the transmission efficiency in the wireless service that transmits relatively small data with low latency, like URLLC. For example, PDCP-duplication may be applied in transmitting URLLC data.

Figure 10:
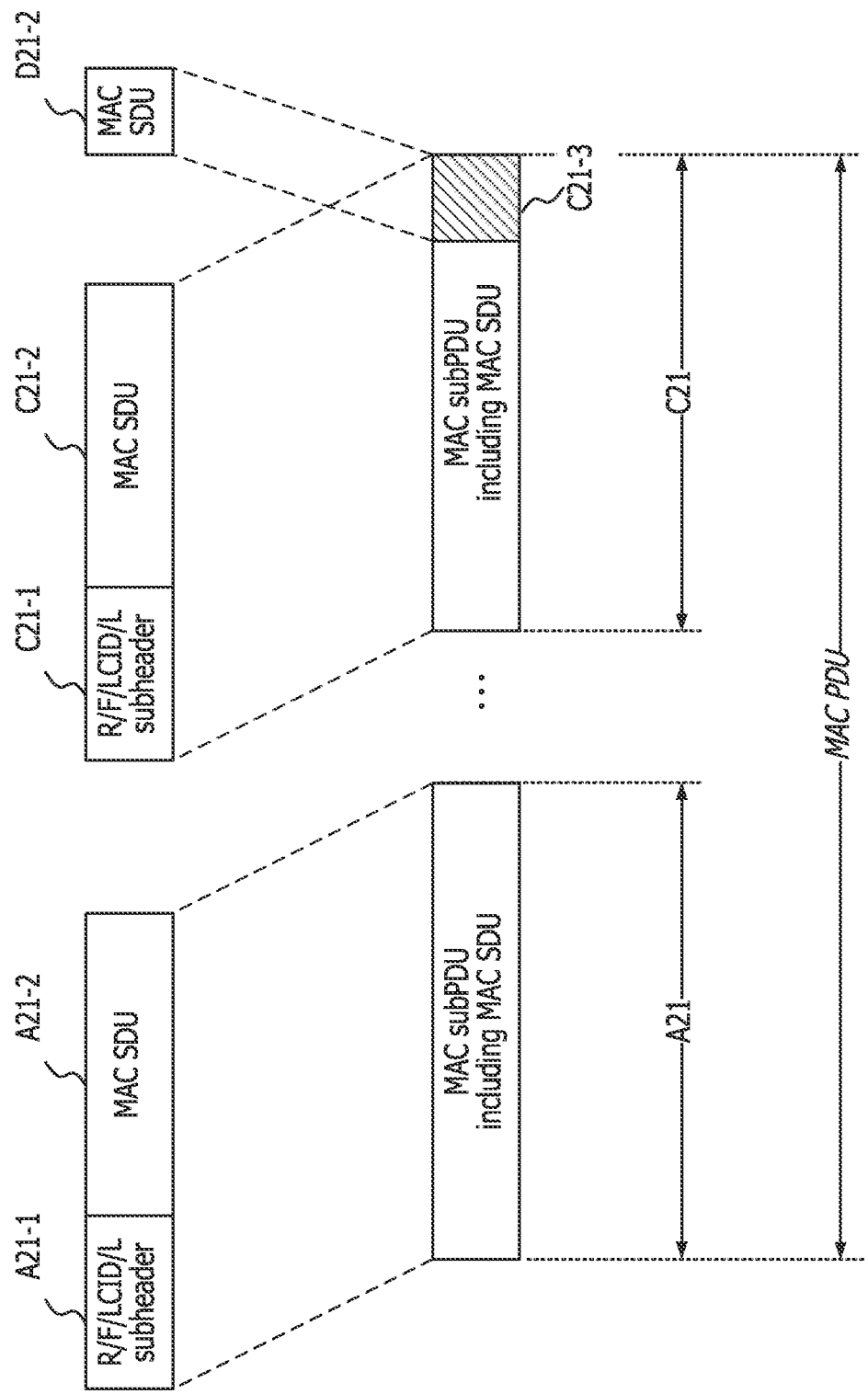
FIG. 10 is a diagram (part 6) illustrating an example of uplink radio resource allocation in the UE 10 according to Example 1.

FIG. 10 is a diagram (part 6) illustrating an example of the uplink radio resource allocation in the UE 10 according to Example 1. In FIG. 10, the MAC sub-header D21-1 of the first data is omitted, similarly to the case in FIG. 9. The MAC-PDU in FIG. 10 includes, similarly to the example in FIG. 9, a MAC sub-PDU (A21) including a MAC-SDU (A21-2) including transmission data from the radio bearer RB[A] (logical channel LCH-A) and a MAC sub-header A21-1, a MAC sub-PDU (B21) (not illustrated) including a MAC-SDU (B21-2) (not illustrated) including transmission data from the radio bearer RB[B] (logical channel LCH-B) and a MAC sub-header B21-1 (not illustrated), and a MAC sub-PDU (C21) including a MAC-SDU (C21-2) including transmission data from the radio bearer RB[C] (logical channel LCH-C) and a MAC sub-header C21-1. In the MAC-SDU (C21) in FIG. 10, the transmission data from the radio bearer RB[C] (logical channel LCH-C) is punctured in the first region C21-3 as a partial area. The first region C21-3 in FIG. 10 includes a MAC-SDU (D21-2) including the transmission data (which can also be called first data) from the radio bearer RB[D] (logical channel LCH-D) used as the first wireless service. As described above, the first region C21-3 in FIG. 10 may not include the MAC sub-header corresponding to the MAC-SDU (D21-2). Note that the MAC-PDU in FIG. 10 may include a MAC sub-PDU including a MAC control element (MAC-CE).

In the MAC sub-PDU of the first data multiplexed in the first region (puncture region), as illustrated in FIGS. 9 and 10, the data structure from which the MAC sub-header is omitted may be effective in the case where setting information (which can also be called first setting information) indicating the position where the first region is placed is set in advance in the UE 10 by the gNB 20. In other words, the UE 10 may be configured not to use the data structure from which the MAC sub-header is omitted before receiving the setting information indicating the position where the first region is placed from the gNB 20. In other words, the UE 10 may be configured not to use the data structure from which the MAC sub-header is omitted at the point of time before sharing the setting information indicating the position where the first region is placed with the gNB 20. This is because in a case of mapping the first data from which the MAC sub-header is omitted to an arbitrary region, the gNB 20 as a receiving station may fail in decoding of the first data. In other words, in the case of mapping the first data from which the MAC sub-header is omitted to an arbitrary region, the gNB 20 as a receiving station needs to find out the first data from the received signal by blind search. Therefore, hardware resources of the gNB 20 may be overused. To eliminate such an inconvenience, it is useful for the UE 10 and the gNB 20 to share the setting information indicating the position where the first region is arranged (first setting information) in advance. Such first setting information may be, for example, setting information (parameters) of semi-persistent scheduling (SPS) for semi-persistently allocating radio resources for the transmission data of the first wireless service (for example, URLLC).

The UE 10 may add a known signal sequence to the beginning of the first data in multiplexing the first data in the first region secured in part of the region where the transmission data of the second wireless service is stored. The gNB 20 may determine whether or not the first data is multiplexed in a TB by restoring the TB from the received signal and searching for the known signal sequence from the data stored in the TB.

Note that the first data may become noise in processing of receiving uplink data (transmission data in the UE 10) of the second wireless service in which the first data is multiplexed. However, the gNB 20 can succeed in the processing of receiving the uplink data of the second wireless service as long as the amount of the first data of the first wireless service is small to an extent that a noise component can be correctly corrected by an error correction function of the second wireless service. Furthermore, the gNB 20 can receive the data by processing of retransmitting the uplink data of the second wireless service even if the gNB 20 fails in the processing of receiving the uplink data of the second wireless service in which the first data is multiplexed. As described above, in the 5G system, the delay in URLLC is aimed at 0.5 ms (milliseconds), whereas the delay in eMBB is 4 ms (milliseconds). For example, setting the first wireless service to URLLC and the second wireless service to eMBB is suitable for implementing the required specifications aimed at in the 5G system. Note that the present disclosure is not limited to the above.

Figure 11:
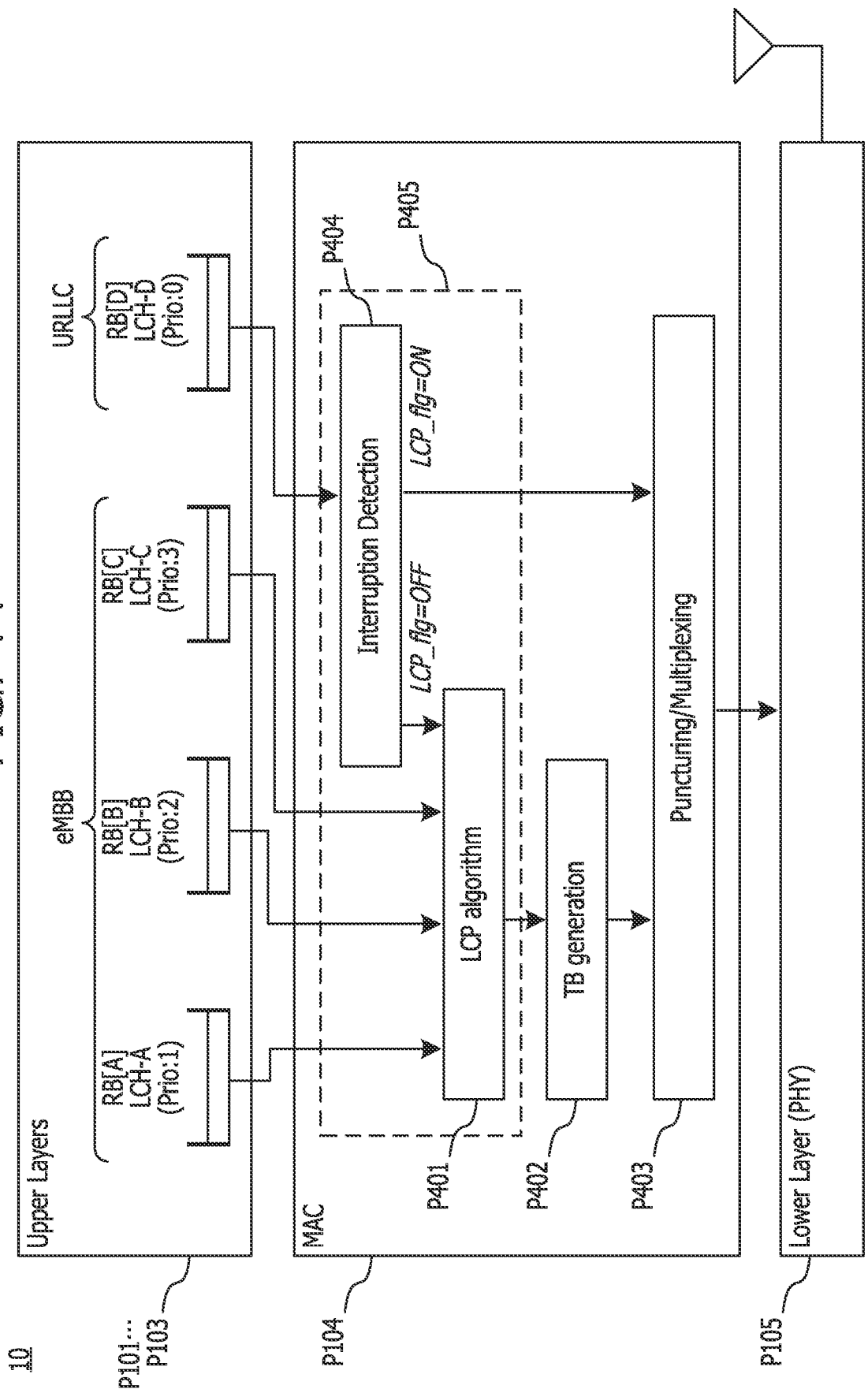
FIG. 11 is a diagram illustrating an example of a functional configuration of the U-Plane protocol stack in the UE 10 according to Example 1.

FIG. 11 is a diagram illustrating an example of a functional structure of the U-Plane protocol stack in the UE 10 according to Example 1. The UE 10 illustrated in FIG. 11 includes the upper layers (P101, P102, and P103), the MAC layer P104, and the lower layer P105 as a functional configuration of the U-Plane protocol stack.

In the upper layers (P101, P102, and P103) in FIG. 11, the buffers corresponding to the respective radio bearer RB[A] (logical channel LCH-A), the radio bearer RB[B] (logical channel LCH-B), the radio bearer RB[C] (logical channel LCH-C), and the radio bearer RB[D] (logical channel LCH-D) are illustrated. The radio bearer RB[D] (logical channel LCH-D) among the radio bearers illustrated in FIG. 11 is allocated to a wireless service of URLLC, and the radio bearer RB[A] (logical channel LCH-A), the radio bearer RB[B] (logical channel LCH-B, and the radio bearer RB[C] (logical channel LCH-C) are allocated to wireless services of eMBB. Here, URLLC is an example of the first wireless service, and eMBB is an example of the second wireless service.

The MAC layer P104 in FIG. 11 includes an LCP algorithm module P401, a TB generation module P402, a puncture and multiplexing module P403, and an interrupt detection module P404. Note that the LCP algorithm module P401 and the interrupt detection module P404 can be collectively called a priority control module P405.

The priority control module P405 is configured to receive inputs of the transmission data from each of the radio bearers of the upper layers (P101 to P103) in the U-Plane protocol stack, and allocate the uplink radio resources by the LCP algorithm module P401. The LCP algorithm module P401 corresponds to S102 in the flow of the processing illustrated in FIG. 3.

Furthermore, the priority control module P405 is configured to execute the interrupt detection module P404 in the case of receiving the input of the transmission data from the radio bearer of the first wireless service (URLLC). The interrupt detection module P404 is configured to switch a processing system of the transmission data from the radio bearer of the first wireless service according to whether the LCP flag (LCP_flg) is set to ON or OFF. The interrupt detection module P404 corresponds to S201 in the flow of the processing illustrated in FIG. 6. Note that the processing system may be implemented as a sub-channel (which can also be called logical channel or sub-logical channel).

For example, in the case where the LCP flag is OFF (LCP_flg=OFF in FIG. 11), the interrupt detection module P404 supplies the transmission data from the radio bearer of the first wireless service to the LCP algorithm module P401. Thereby, the transmission data from the radio bearer of the first wireless service waits in the buffer until the uplink radio resource allocation is executed by the LCP algorithm module P401, similarly to the transmission data from the radio bearer of another wireless service (second wireless service). As illustrated in FIG. 3, the LCP flag is set to ON (S103 in FIG. 3) after execution of the uplink radio resource allocation (S102 in FIG. 3) by the LCP algorithm module P401, and is set to OFF (S106 in FIG. 3) after the TB generated by the uplink radio resource allocation is transferred to a lower layer (S105 in FIG. 3). That is, according to one aspect, the LCP flag to which an OFF value is set indicates that a TB in which the transmission data from the radio bearer of the first wireless service should be multiplexed has not been prepared yet. Therefore, in the case where the LCP flag is OFF at the time when the transmission data from the radio bearer of the first wireless service is input, the transmission data of the first wireless service waits for execution of the uplink radio resource allocation by the LCP algorithm module P401.

Note that a sub-channel A (which can also be called first sub-channel) may be used as a processing system selected in the case where the LCP flag is OFF. The sub-channel A has a function as a channel for which selection of a radio resource by LCP is performed together with the logical channel of the second wireless service in the LCP algorithm module P401. For example, in the case where the LCP flag is OFF, the interrupt detection module P404 may supply the transmission data from the radio bearer of the first wireless service to the LCP algorithm module P401 via the sub-channel A.

On the other hand, in the case where the LCP flag is ON (LCP_flg=ON in FIG. 11), the interrupt detection module P404 supplies the transmission data from the radio bearer of the first wireless service to the puncture and multiplexing module P403. Thereby, the transmission data from the radio bearer of the first wireless service is multiplexed in the TB generated by the TB generation module P402 and wirelessly transmitted from an antenna of the UE 10 via the lower layer P105. According to one aspect, the LCP flag to which an ON value is set indicates that a TB in which the transmission data from the radio bearer of the first wireless service should be multiplexed has been prepared. Therefore, in the case where the LCP flag is ON at the time when the transmission data from the radio bearer of the first wireless service is input, the interrupt detection module P404 skips the processing of allocating the uplink radio resources by the LCP algorithm module P401 for the transmission data of the first wireless service, and delivers the transmission data to the puncture and multiplexing module P403.

Note that a sub-channel B (which can also be called second sub-channel) may be used as a processing system selected in the case where the LCP flag is ON. The sub-channel B has a function as a channel for supplying the transmission data from the radio bearer of the first wireless service to the puncture and multiplexing module P403. For example, in the case where the LCP flag is ON, the interrupt detection module P404 may supply the transmission data from the radio bearer of the first wireless service to the puncture and multiplexing module P403 via the sub-channel B.

According to one aspect, in the case where the LCP flag is ON, the LCP algorithm module P401 is skipped and a radio resource is allocated to the transmission data from the radio bearer of the first wireless service. In other words, the LCP flag being ON can be interpreted to mean skipping LCP for the transmission data from the radio bearer of the first wireless service (may also be called LCP skip or skipping).

The TB generation module P402 is configured to generate a TB on the basis of the transmission data of the radio bearer to which the uplink radio resource is allocated by the LCP algorithm module P401. The TB generation module P402 corresponds to S104 in the flow of the processing illustrated in FIG. 3.

In the case where the transmission data of the first wireless service is delivered from the interrupt detection module P404, the puncture and multiplexing module P403 is configured to puncture a partial region of the TB generated by the TB generation module P402, and multiplex the transmission data of the first wireless service in the punctured TB. The puncture and multiplexing module P403 corresponds to S202 to S205 in the flow of the processing illustrated in FIG. 6. Note that, in the case where the transmission data of the first wireless service is not delivered from the interrupt detection module P404, the puncture and multiplexing module P403 may transfer the TB generated by the TB generation module P402 to the lower layer P105 without puncturing the TB.

The above is an example of the functional structure of the U-Plane protocol stack in the UE 10 according to Example 1.

According to one aspect of the above-disclosed Example 1, the uplink radio resource allocation is permitted for transmission data that has occurred after LCP processing in the UE 10 is executed. Thereby, a delay in the uplink data transmission in the UE 10 can be reduced. Such a function is useful for implementing uplink ultra-reliable and low-latency communications in the 5G system.

According to another aspect of Example 1 disclosed above, in the UE 10 capable of wirelessly communicating with the gNB 20 using a plurality of wireless services including the first wireless service having a priority higher than another wireless service (which can also be called second wireless service) and the second wireless service, the transmission data of the first wireless service is multiplexed in part of the radio resource allocated to the transmission data of the second wireless service in transmitting the uplink wireless signal. Thereby, the transmission delay of the transmission data of the first wireless service that has occurred after the uplink radio resource is allocated to the transmission data of the second wireless service can be shortened. Such a function is useful for implementing uplink ultra-reliable and low-latency communications in the 5G system.

According to still another aspect of Example 1 disclosed above, in the case where a TB generated by the TB generation module P402 has already been available at the time when the uplink transmission data of the first wireless service has occurred, the transmission data of the first wireless service is multiplexed in the region (puncture region) obtained by puncturing part of the TB. Thereby, the transmission delay of the transmission data of the first wireless service that has occurred after the uplink radio resource allocation processing by the LCP algorithm module P401 is completed can be shortened. Such a function is useful for implementing uplink ultra-reliable and low-latency communications in the 5G system.

<Example 2> In Example 2, part of functional structure of a U-Plane protocol stack in a UE 10 is implemented in a lower layer P105. In other words, the UE 10 according to Example 2 executes processing regarding interrupt communication in cooperation with a plurality of layers in the uplink U-Plane protocol stack.

Figure 12:
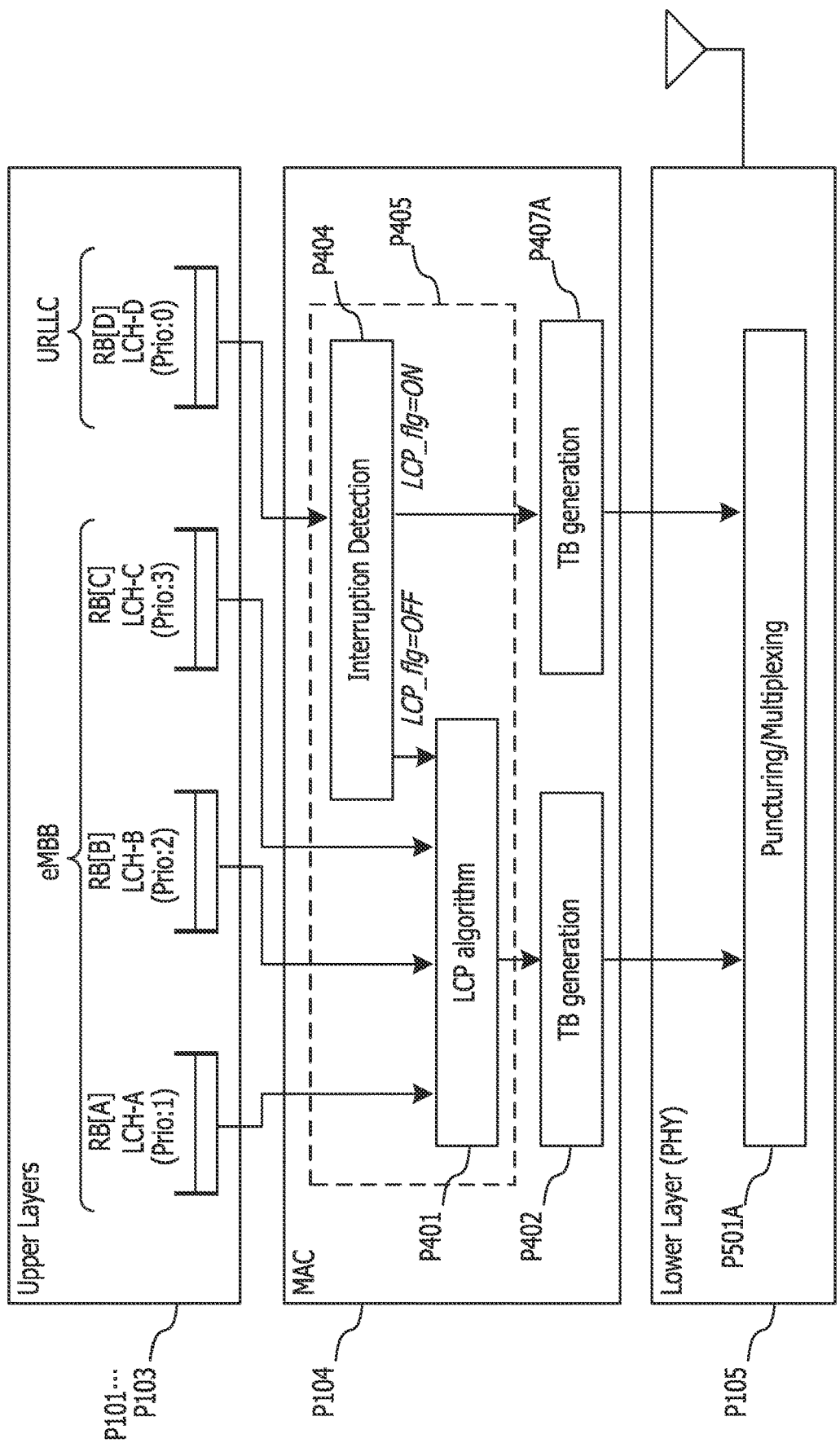
FIG. 12 is a diagram illustrating an example of a functional configuration of U-Plane protocol stack in a UE 10 according to Example 2.

FIG. 12 is a diagram illustrating an example of a functional configuration of the U-Plane protocol stack in the UE 10 according to Example 2. The UE 10 according to Example 2 illustrated in FIG. 12 includes upper layers (P101, P102, and P103), a MAC layer P104, and the lower layer P105 as a functional configuration of the U-Plane protocol stack, similarly to FIG. 11.

In the upper layers (P101, P102, and P103) in FIG. 12, buffers corresponding to a respective radio bearer RB[A] (logical channel LCH-A), a radio bearer RB[B] (logical channel LCH-B), a radio bearer RB[C] (logical channel LCH-C), and a radio bearer RB[D] (logical channel LCH-D) are illustrated. The radio bearer RB[D] (logical channel LCH-D) among the radio bearers illustrated in FIG. 11 is allocated to a wireless service of URLLC, and the radio bearer RB[A] (logical channel LCH-A), the radio bearer RB[B] (logical channel LCH-B, and the radio bearer RB[C] (logical channel LCH-C) are allocated to wireless services of eMBB. Here, URLLC is an example of a first wireless service, and eMBB is an example of a second wireless service.

In the structural example in Example 1 illustrated in FIG. 11, the module regarding interrupt communication (IC) is intensively implemented in the MAC layer P104. However, the UE 10 according to Example 2 illustrated in FIG. 12 has modules regarding the interrupt communication implemented in the MAC layer P104 and the lower layer P105.

That is, the MAC layer P104 in FIG. 12 includes an LCP algorithm module P401 and a TB generation module P402 (which can also be called first TB generation module P402), and an interrupt detection module P404, but does not include a puncture and multiplexing module P403. Furthermore, the MAC layer P104 of FIG. 12 includes a second TB generation module P407A as a delivery destination (in the case where an LCP flag is ON) of the transmission data of the first wireless service from the interrupt detection module P404.

A puncture and multiplexing module P501A is added to the lower layer P105 in FIG. 12. Thereby, the UE 10 according to Example 2 can multiplex the transmission data of the first wireless service in a partial region of the TB which has transferred to the lower layer P105 by the puncture and multiplexing module P501A in the lower layer P105.

An overall flow of the functional structure of the U-Plane protocol stack illustrated in FIG. 12 is similar to the example illustrated in FIG. 11. For example, a priority control module P405 receives inputs of the transmission data from the respective radio bearers of the upper layers (P101 to P103) in the U-Plane protocol stack, and allocates the uplink radio resources by the LCP algorithm module P401.

Furthermore, the priority control module P405 executes the interrupt detection module P404 in the case of receiving the input of the transmission data from the radio bearer of the first wireless service (URLLC). The interrupt detection module P404 switches a processing system of the uplink transmission data from the radio bearer of the first wireless service according to whether the LCP flag (LCP_flg) is set to ON or OFF. Note that the processing system may be implemented as a sub-channel (which can also be called logical channel or sub-logical channel).

For example, in the case where the LCP flag is OFF (LCP_flg=OFF in FIG. 12), the interrupt detection module P404 delivers the transmission data from the radio bearer of the first wireless service to the LCP algorithm module P401. Thereby, the transmission data from the radio bearer of the first wireless service waits in the buffer until the uplink radio resource allocation is executed by the LCP algorithm module P401, similarly to the transmission data from the radio bearer of another wireless service (second wireless service). According to one aspect, the LCP flag to which an OFF value is set indicates that a TB in which the transmission data from the radio bearer of the first wireless service should be multiplexed has not been prepared yet.

Note that a sub-channel A (which can also be called first sub-channel) may be used as a processing system selected in the case where the LCP flag is OFF. The sub-channel A has a function as a channel for which selection of a radio resource by LCP is performed together with the logical channel of the second wireless service in the LCP algorithm module P401. For example, in the case where the LCP flag is OFF, the interrupt detection module P404 may supply the transmission data from the radio bearer of the first wireless service to the LCP algorithm module P401 via the sub-channel A.

On the other hand, in the case where the LCP flag is ON (LCP_flg=ON in FIG. 12), the interrupt detection module P404 delivers the transmission data from the radio bearer of the first wireless service to the second TB generation module P407A. The second TB generation module P407A is configured to generate a TB (which can also be called second TB) on the basis of the uplink transmission data of the first wireless service delivered from the interrupt detection module P404 and supply the second TB to the puncture and multiplexing module P501A in the lower layer P105, which is different from the first TB generation module P402 that receives the delivery from the LCP algorithm module P401 and generates a TB (which can also be called first TB). Therefore, the second TB generation module P407A can be executed at timing different from an execution trigger of processing of allocating an uplink radio resource by the LCP algorithm module P401.

Note that a sub-channel B (which can also be called second sub-channel) may be used as a processing system selected in the case where the LCP flag is ON. The sub-channel B has a function as a channel for delivering the transmission data from the radio bearer of the first wireless service to the second TB generation module P407A. For example, in the case where the LCP flag is ON, the interrupt detection module P404 may deliver the transmission data from the radio bearer of the first wireless service to the second TB generation module P407A via the sub-channel B.

The puncture and multiplexing module P501A in FIG. 12 is configured to puncture a partial region of the first TB delivered from the first TB generation module P402, and multiplex the second TB supplied from the second TB generation module P407A in the punctured region. A wireless signal in which the first TB and the second TB are multiplexed is wirelessly transmitted from an antenna. Furthermore, in the case where the second TB is not delivered from the second TB generation module P407A, the puncture and multiplexing module P501A may wirelessly transmit a wireless signal generated using the first TB supplied from the first TB generation module P402 from an antenna.

Figure 13:
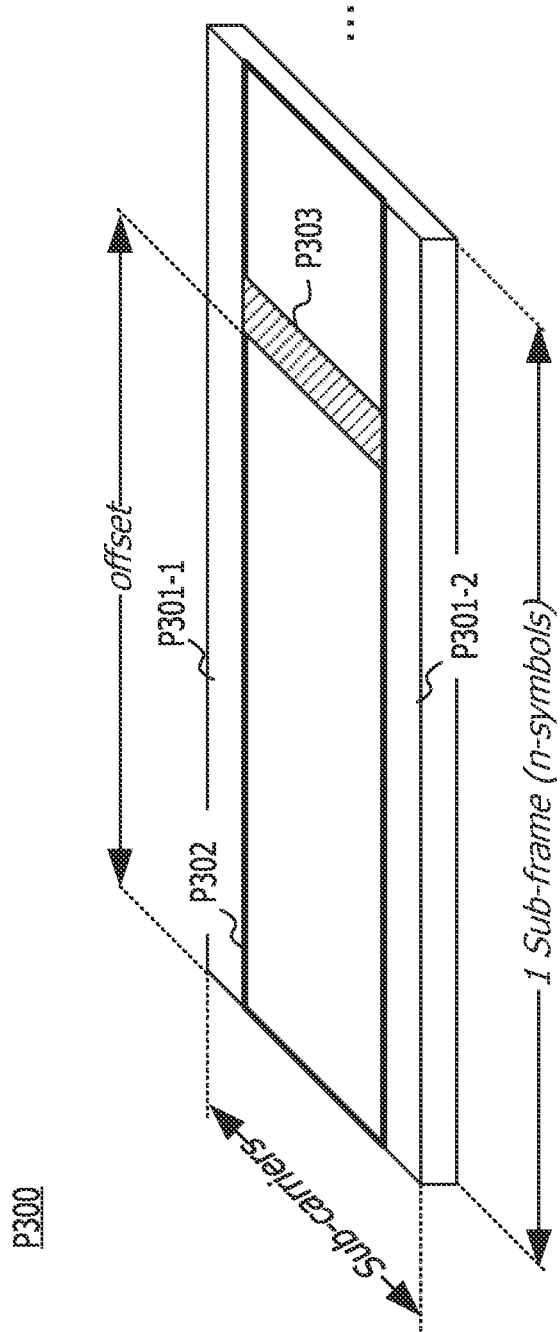
FIG. 13 is a diagram illustrating a configuration example of an uplink sub-frame transmitted by the UE 10 according to Example 2.

FIG. 13 is a diagram illustrating a structural example of an uplink sub-frame P300 transmitted by the UE 10 according to Example 2. The uplink sub-frame P300 illustrated in FIG. 13 includes a plurality of radio resources specified by n symbols in a time axis direction and a plurality of sub-carriers in a frequency axis direction. In FIG. 13, the uplink sub-frame P300 includes radio resource regions (P301-1 and P301-2) to be allocated to a control signal wireless channel (may also be called physical uplink control channel (PUCCH), an a region P302 (which can also be called data region P302) for a radio resource to be allocated to a user data wireless channel (physical uplink shared channel (PUSCH)). The puncture and multiplexing module P501A stores the first TB delivered from the first TB generation module P402 in the radio resource in the data region P302. At that time, encoding/modulation processing based on a predetermined encoding method or the like may be executed.

The puncture and multiplexing module P501A stores (multiplexes) the second TB delivered from the second TB generation module P407A in a partially punctured region P303 (puncture region P303) of a data region P303. At that time, in the puncture region P303, a known signal (may also be called pilot signal, reference signal, or demodulation reference signal) to be used for demodulating the second TB may be inserted at predetermined sub-carrier intervals.

Note that the position of the puncture region P303 may be determined on the basis of setting information shared in advance with a gNB 20. The UE 10 may receive the setting information transmitted from the gNB 20 in order to share such setting information with the gNB 20. In the setting information, what number's symbol from a first symbol of a sub-frame is set to be a starting position of the puncture region P303 may be set using an offset value. Furthermore, in a case of allocating a plurality of symbols to the puncture region P303, the number of symbols allocated to the puncture region P303 may be set using a length value. Alternatively, the position of the radio resource allocated to the puncture region P303 may be set in a predetermined unit such as resource element group (REG).

Figure 14:
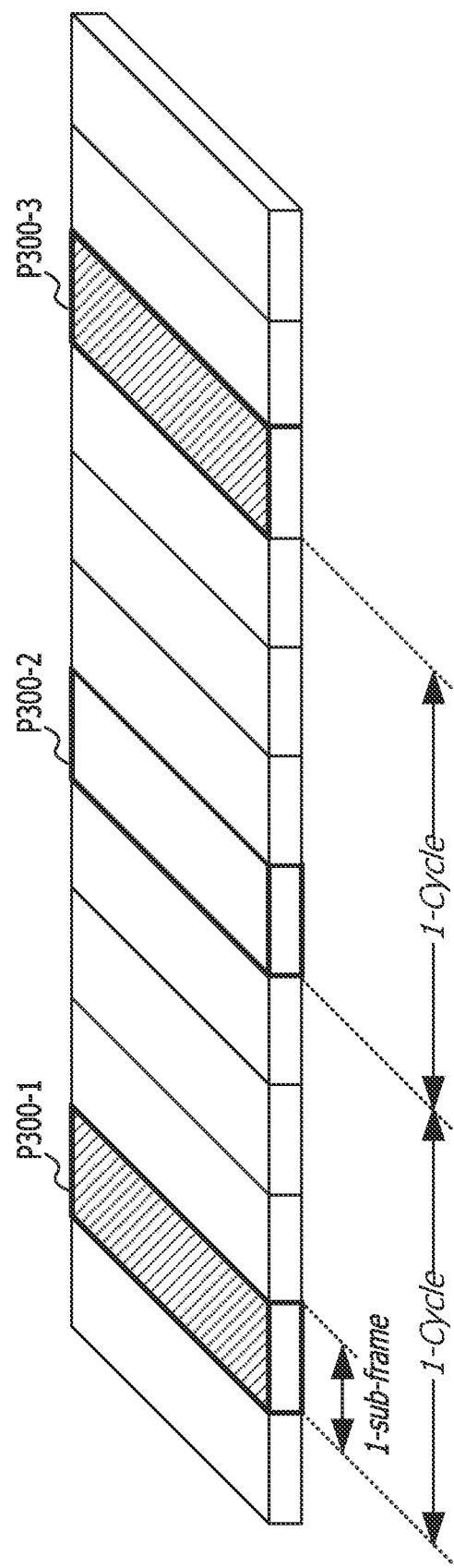
FIG. 14 is a diagram illustrating a configuration example of an uplink radio frame transmitted by the UE 10 according to Example 2.

FIG. 14 is a diagram illustrating a configuration example of an uplink radio frame transmitted by the UE 10 according to Example 2. In FIG. 14, a plurality of sub-frames is placed in a time direction, and sub-frames (P300-1, P300-2, and P300-3) matching timing when the uplink radio resources for the first wireless service are semi-persistently reserved in a predetermined periodicity are illustrated in bold lines. In the sub-frames (P300-1, P300-2, and P300-3), in a case where the transmission data of the first wireless service is present, as illustrated in FIG. 13, the transmission data of the first wireless service is stored in the region P303.

In the example in FIG. 14, the sub-frame P300-1 and the sub-frame P300-3 include the region P303 in which the transmission data of the first wireless service is stored. On the other hand, in the sub-frame P300-2, since the transmission data of the first wireless service has not occurred, the transmission data of the first wireless service is not stored in the region P303, and transmission data of another wireless service (second wireless service) is stored in the region P303. Even if the uplink radio resources are semi-persistently reserved for the first wireless service in a predetermined periodicity, as described above, the uplink transmission data of the first wireless service is not necessarily transmitted.

The above is an example of the functional structure of the U-Plane protocol stack in the UE 10 according to Example 2.

According to one aspect of the above-disclosed Example 2, the uplink radio resource allocation is permitted for transmission data that has occurred after LCP processing in the UE 10 is executed. Thereby, a delay in the uplink data transmission in the UE 10 can be reduced. Such a function is useful for implementing uplink ultra-reliable and low-latency communications in the 5G system.

According to another aspect of Example 2 disclosed above, in the UE 10 capable of wirelessly communicating with the gNB 20 using a plurality of wireless services including the first wireless service having a priority higher than another wireless service (which can also be called second wireless service) and the second wireless service, the transmission data of the first wireless service is multiplexed in part of the radio resource allocated to the transmission data of the second wireless service in transmitting the uplink wireless signal. Thereby, the transmission delay of the transmission data of the first wireless service that has occurred after the uplink radio resource is allocated to the transmission data of the second wireless service can be shortened. Such a function is useful for implementing uplink ultra-reliable and low-latency communications in the 5G system.

According to still another aspect of Example 2 disclosed above, in the case where the first TB generated by the first TB generation module P402 has already been available at the time when the uplink transmission data of the first wireless service has occurred, the transmission data of the first wireless service is multiplexed in the region P303 (puncture region P303) obtained by puncturing part of the data region P302 where the first TB is stored. Thereby, the transmission delay of the transmission data of the first wireless service that has occurred after the uplink radio resource allocation processing by the LCP algorithm module P401 is completed can be shortened. Such a function is useful for implementing uplink ultra-reliable and low-latency communications in the 5G system.

<Example 3> In Example 3, another modification of a functional structure of U-Plane protocol stack in a UE 10 will be described. The UE 10 according to Example 3 includes a first processing system for processing uplink transmission data of a first wireless service and a second processing system for processing uplink transmission data of a second wireless service. Then, in a case where a TB generated by a TB generation module P402 of the second processing system is available at the time when the uplink transmission data of the first wireless service has occurred, the uplink transmission data of the first wireless service is multiplexed in the TB of the second processing system. On the other hand, in a case where the TB generated by the TB generation module P402 of the second processing system has not been available yet at the time when the uplink transmission data of the first wireless service has occurred, the uplink transmission data of the first wireless service is processed by the first processing system.

Figure 15:
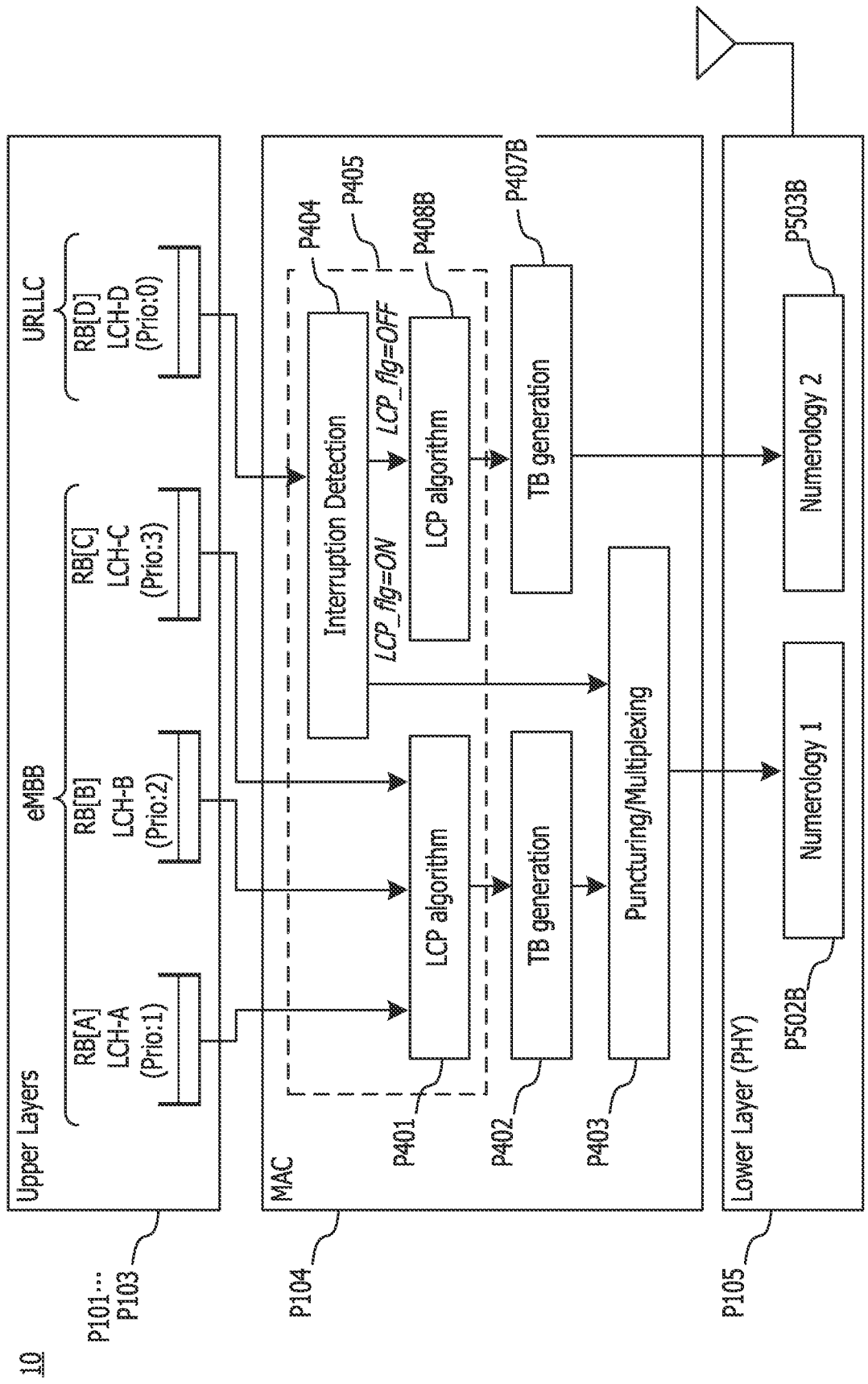
FIG. 15 is a diagram illustrating an example of a functional configuration of U-Plane protocol stack in a UE 10 according to Example 3.

FIG. 15 is a diagram illustrating an example of a functional structure of U-Plane protocol stack in the UE 10 according to Example 3. The UE 10 according to Example 3 illustrated in FIG. 15 includes upper layers (P101, P102, and P103), a MAC layer P104, and a lower layer P105 as a functional configuration of the U-Plane protocol stack, similarly to FIG. 11.

In the upper layers (P101, P102, and P103) in FIG. 15, buffers corresponding to a radio bearer RB[A] (logical channel LCH-A), a radio bearer RB[B] (logical channel LCH-B), a radio bearer RB[C] (logical channel LCH-C), and a radio bearer RB[D] (logical channel LCH-D) respectively, are illustrated. The radio bearer RB[D] (logical channel LCH-D) among the radio bearers illustrated in FIG. 11 is allocated to a wireless service of URLLC, and the radio bearer RB[A] (logical channel LCH-A), the radio bearer RB[B] (logical channel LCH-B, and the radio bearer RB[C] (logical channel LCH-C) are allocated to wireless services of eMBB. Here, URLLC is an example of a first wireless service, and eMBB is an example of a second wireless service.

In the configuration example in Example 1 illustrated in FIG. 11, the processing system including the LCP algorithm module P401 is one, whereas in the UE 10 according to Example 3 illustrated in FIG. 15, the first processing system including an LCP algorithm module P408B and the second processing system including an LCP algorithm module P401 are present. In the first processing system in FIG. 15, the uplink transmission data of the first wireless service is mapped to the first sub-carrier space and wirelessly transmitted by the LCP algorithm module P408B, a TB generation module P407B, and a Numerology2 module P503B. Furthermore, in the second processing system, the uplink transmission data of the second wireless service and/or the uplink transmission data of the first wireless service are mapped to the second sub-carrier space and wirelessly transmitted by the LCP algorithm module P401, the TB generation module P402, a puncture and multiplexing module P403, and a Numerology1 module P502B. Here, Numerology is a general term for wireless parameters such as sub-carrier intervals and transmission time interval (TTI) lengths. The wireless parameter used by the Numerology1 module P502B is a value that is at least partially different from the wireless parameter used by the Numerology2 module P503B.

In the structural example in FIG. 15, an LCP flag (LCP_flg) is set to ON in response to execution of processing of allocating an uplink radio resource by the LCP algorithm module P401 of the second processing system. After the TB generated by the TB generation module P402 of the second processing system is transferred to the lower layer P105, the LCP flag is set to OFF. That is, in the structural in Example 3, the value of the LCP flag that affects selection of the processing system of the uplink transmission data of the first wireless service is set in association with the operation of the second processing system.

An interrupt detection module P404 in Example 3 is configured to switch the processing system of the uplink transmission data from the radio bearer of the first wireless service according to whether the LCP flag (LCP_flg) is set to ON or OFF. Note that the processing system may be implemented as a sub-channel (which can also be called logical channel or sub-logical channel).

For example, in the case where the LCP flag is OFF (LCP_flg=OFF in FIG. 15) at the time when the uplink transmission data of the first wireless service has occurred, the interrupt detection module P404 delivers the transmission data from the radio bearer of the first wireless service to the first processing system. According to one aspect, the LCP flag to which an OFF value is set indicates that the TB of the second processing system with which the transmission data from the radio bearer of the first wireless service should be multiplexed has not been prepared yet. In this case, an uplink radio resource is allocated to the transmission data from the radio bearer of the first wireless service by the LCP algorithm module P408B, and a TB (which can also be called first TB) of the transmission data of the first wireless service is generated by the TB generation module P407B. Then, the first TB is mapped to the first sub-carrier space and wirelessly transmitted from an antenna by the Numerology2 module P503B.

Note that a sub-channel A (which can also be called first sub-channel) may be used as a processing system selected in the case where the LCP flag is OFF. The sub-channel A according to the present example has a function as a channel for which selection of a radio resource by LCP is performed in the LCP algorithm module P408B of the first processing system. For example, in the case where the LCP flag is OFF, the interrupt detection module P404 may deliver the transmission data from the radio bearer of the first wireless service to the LCP algorithm module P408B of the first processing system via the sub-channel A.

On the other hand, in the case where the LCP flag is ON (LCP_flg=ON in FIG. 15) at the time when the uplink transmission data of the first wireless service has occurred, the interrupt detection module P404 delivers the transmission data from the radio bearer of the first wireless service to the second processing system. According to one aspect, the LCP flag to which an ON value is set indicates that the TB of the second processing system with which the transmission data from the radio bearer of the first wireless service should be multiplexed has been prepared or will be practically available soon. In this case, the transmission data from the radio bearer of the first wireless service is multiplexed in the TB generated by the TB generation module P402 of the second processing system, by the puncture and multiplexing module P403. Thereby, a TB (also referred to as a second TB) including the transmission data of the first wireless service and the transmission data of the second wireless service is generated. Then, the second TB is mapped to the second sub-carrier space and wirelessly transmitted from an antenna by the Numerology1 module P502B. Note that the second sub-carrier space is a radio resource that is at least partially different from the first sub-carrier space by the Numerology2 module P503B.

Note that a sub-channel B (which can also be called second sub-channel) may be used as a processing system selected in the case where the LCP flag is ON. The sub-channel B has a function as a channel for supplying the transmission data from the radio bearer of the first wireless service to the puncture and multiplexing module P403. For example, in the case where the LCP flag is ON, the interrupt detection module P404 may deliver the transmission data from the radio bearer of the first wireless service to the puncture and multiplexing module P403 via the sub-channel B.

The above is an example of the functional configuration of the U-Plane protocol stack in the UE 10 according to Example 3.

According to one aspect of the above-disclosed Example 3, the uplink radio resource allocation is permitted for transmission data that has occurred after LCP processing in the UE 10 is executed. Thereby, a delay in the uplink data transmission in the UE 10 can be reduced. Such a function is useful for implementing uplink ultra-reliable and low-latency communications in the 5G system.

According to another aspect of Example 3 disclosed above, in the UE 10 capable of wirelessly communicating with the gNB 20 using a plurality of wireless services including the first wireless service having a priority higher than another wireless service (which can also be called second wireless service) and the second wireless service, the transmission data of the first wireless service is multiplexed in part of the radio resource allocated to the transmission data of the second wireless service in transmitting the uplink wireless signal. Thereby, the transmission delay of the transmission data of the first wireless service that has occurred after the uplink radio resource is allocated to the transmission data of the second wireless service can be shortened. Such a function is useful for implementing uplink ultra-reliable and low-latency communications in the 5G system.

According to still another aspect of Example 3 disclosed above, in the case where a TB generated by the TB generation module P402 has already been present at the time when the uplink transmission data of the first wireless service has occurred, the transmission data of the first wireless service is multiplexed in the region (puncture region) obtained by puncturing part of the TB. Thereby, the transmission delay of the transmission data of the first wireless service that has occurred after the uplink radio resource allocation processing by the LCP algorithm module P401 is completed can be shortened. Such a function is useful for implementing uplink ultra-reliable and low-latency communications in the 5G system.

According to still another aspect of Example 3 disclosed above, in the UE 10 capable of wirelessly communicating with the gNB 20 using a plurality of wireless services including the first wireless service having a priority higher than another wireless service (which can also be called second wireless service) and the second wireless service, the first processing system that is an uplink processing system of the first wireless service and the second processing system that is an uplink processing system of the second wireless service are implemented. Thereby, in the case where the TB of the second processing system has already been prepared at the time when the uplink transmission data of the first wireless service has occurred, the transmission data of the first wireless service is multiplexed in the partially punctured region (puncture region) of the TB of the second processing system. On the other hand, in the case where the TB of the second processing system has not been prepared yet at the time when the uplink transmission data of the first wireless service has occurred, the transmission data of the first wireless service is processed by the first processing system. With such a configuration, the transmission delay of the uplink transmission data of the first wireless service can be shortened. Such a function is useful for implementing uplink ultra-reliable and low-latency communications in the 5G system.

<Example 4> In Example 4, a modification of a combination of Example 2 and Example 3 regarding a functional structure of U-Plane protocol stack in a UE 10 will be described. That is, the UE 10 according to Example 4 includes a first processing system for processing uplink transmission data of the first wireless service and a second processing system for processing uplink transmission data of the second wireless service. In the second processing system according to Example 4, a puncture and multiplexing module for multiplexing the transmission data of the first wireless service and the transmission data of the second wireless service is implemented in a lower layer P105.

Figure 16:
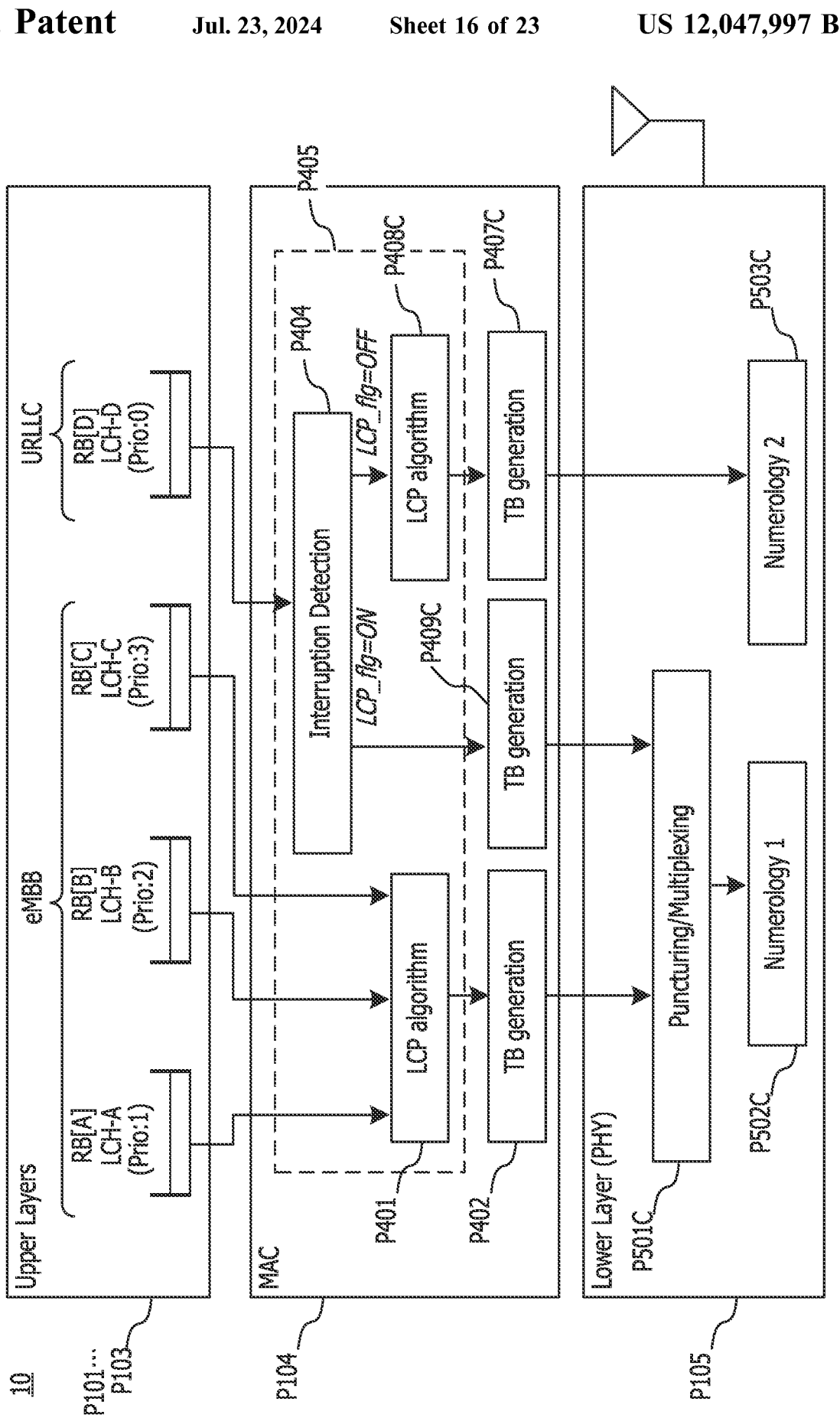
FIG. 16 is a diagram illustrating an example of a functional configuration of U-Plane protocol stack in a UE 10 according to Example 4.

FIG. 16 is a diagram illustrating an example of a functional structure of U-Plane protocol stack in a UE 10 according to Example 4. The UE 10 according to Example 4 illustrated in FIG. 16 includes upper layers (P101, P102, and P103), a MAC layer P104, and the lower layer P105 as a functional configuration of the U-Plane protocol stack, similarly to FIG. 11.

In the upper layers (P101, P102, and P103) in FIG. 16, buffers corresponding to the respective radio bearer RB[A] (logical channel LCH-A), a radio bearer RB[B] (logical channel LCH-B), a radio bearer RB[C] (logical channel LCH-C), and a radio bearer RB[D] (logical channel LCH-D) are illustrated. The radio bearer RB[D] (logical channel LCH-D) among the radio bearers illustrated in FIG. 11 is allocated to a wireless service of URLLC, and the radio bearer RB[A] (logical channel LCH-A), the radio bearer RB[B] (logical channel LCH-B, and the radio bearer RB[C] (logical channel LCH-C) are allocated to wireless services of eMBB. Here, URLLC is an example of a first wireless service, and eMBB is an example of a second wireless service.

In the UE 10 according to Example 4 illustrated in FIG. 16, the first processing system including an LCP algorithm module P408C and the second processing system including an LCP algorithm module P401 are present. In the first processing system in FIG. 16, the uplink transmission data of the first wireless service is mapped to a first sub-carrier space and wirelessly transmitted by the LCP algorithm module P408C, a TB generation module P407C, and a Numerology2 module P503C. Furthermore, in the second processing system, the uplink transmission data of the second wireless service and/or the uplink transmission data of the first wireless service are mapped to a second sub-carrier space and wirelessly transmitted by the LCP algorithm module P401, a TB generation module P402, a TB generation module P409C, a puncture and multiplexing module P501C, and a Numerology1 module P502C. Here, Numerology is a general term for wireless parameters such as sub-carrier intervals and transmission time interval (TTI) lengths. The wireless parameter used by the Numerology1 module P502C is a value that is at least partially different from the wireless parameter used by the Numerology2 module P503C.

In the structural example in FIG. 16, an LCP flag (LCP_flg) is set to ON in response to execution of processing of allocating an uplink radio resource by the LCP algorithm module P401 of the second processing system. After a TB generated by the TB generation module P402 of the second processing system is transferred to the lower layer P105, the LCP flag is set to OFF. That is, in the structure in Example 4, the value of the LCP flag that affects selection of the processing system of the uplink transmission data of the first wireless service is configured in association with the operation of the second processing system.

An interrupt detection module P404 in Example 4 is configured to switch the processing system of the uplink transmission data from the radio bearer of the first wireless service according to whether the LCP flag (LCP_flg) is set to ON or OFF. Note that the processing system may be implemented as a sub-channel (which can also be called logical channel or sub-logical channel).

For example, in the case where the LCP flag is OFF (LCP_flg=OFF in FIG. 16) at the time when the uplink transmission data of the first wireless service has occurred, the interrupt detection module P404 delivers the transmission data from the radio bearer of the first wireless service to the first processing system. According to one aspect, the LCP flag to which the OFF value is set indicates that the TB of the second processing system with which the transmission data from the radio bearer of the first wireless service should be multiplexed has not been prepared yet. In this case, an uplink radio resource is allocated to the transmission data from the radio bearer of the first wireless service by the LCP algorithm module P408C, and a TB (which can also be called first TB) of the transmission data of the first wireless service is generated by the TB generation module P407C. Then, the first TB is mapped to the first sub-carrier space and wirelessly transmitted from an antenna by the Numerology2 module P503C.

Note that a sub-channel A (which can also be called first sub-channel) according to the present example may be used as a processing system selected in the case where the LCP flag is OFF. The sub-channel A according to the present example has a function as a channel for which selection of a radio resource by LCP is performed in the LCP algorithm module P408C of the first processing system. For example, in the case where the LCP flag is OFF, the interrupt detection module P404 may deliver the transmission data from the radio bearer of the first wireless service to the LCP algorithm module P408C of the first processing system via the sub-channel A.

On the other hand, in the case where the LCP flag is ON (LCP_flg=ON in FIG. 16) at the time when the uplink transmission data of the first wireless service has occurred, the interrupt detection module P404 delivers the transmission data from the radio bearer of the first wireless service to the second processing system. According to one aspect, the LCP flag to which the ON value is set indicates that the TB of the second processing system with which the transmission data from the radio bearer of the first wireless service should be multiplexed has been prepared or will be practically available soon. In this case, the transmission data from the radio bearer of the first wireless service is supplied to the TB generation module P409C of the second processing system. The TB generation module P409C of the second processing system generates a TB including the transmission data of the first wireless service and supplies the TB to the puncture and multiplexing module P501C in the lower layer P105. Then, the puncture and multiplexing module P501C multiplexes the TB generated by the TB generation module P409C of the second processing system in the TB generated by the TB generation module P402 of the second processing system. Thereby, a TB (also referred to as a second TB) including the transmission data of the first wireless service and the transmission data of the second wireless service is generated. Then, the second TB is mapped to the second sub-carrier space and wirelessly transmitted from an antenna by the Numerology1 module P502C. Note that the second sub-carrier space is a radio resource that is at least partially different from the first sub-carrier space by the Numerology2 module P503C.

Note that a sub-channel B (which can also be called second sub-channel) may be used as a processing system selected in the case where the LCP flag is ON. The sub-channel B has a function as a channel for delivering the transmission data from the radio bearer of the first wireless service to the TB generation module P409C of the second processing system. For example, in the case where the LCP flag is ON, the interrupt detection module P404 may deliver the transmission data from the radio bearer of the first wireless service to the TB generation module P409C of the second processing system via the sub-channel B.

The above is an example of the functional structure of the U-Plane protocol stack in the UE 10 according to Example 4.

According to one aspect of the above-disclosed Example 4, the uplink radio resource allocation is permitted for transmission data that has occurred after LCP processing in the UE 10 is executed. Thereby, a delay in the uplink data transmission in the UE 10 can be reduced. Such a function is useful for implementing uplink ultra-reliable and low-latency communications in the 5G system.

According to another aspect of Example 4 disclosed above, in the UE 10 capable of wirelessly communicating with the gNB 20 using a plurality of wireless services including the first wireless service having a priority higher than another wireless service (which can also be called second wireless service) and the second wireless service, the transmission data of the first wireless service is multiplexed in part of the radio resource allocated to the transmission data of the second wireless service in transmitting the uplink wireless signal. Thereby, the transmission delay of the transmission data of the first wireless service that has occurred after the uplink radio resource is allocated to the transmission data of the second wireless service can be shortened. Such a function is useful for implementing uplink ultra-reliable and low-latency communications in the 5G system.

According to still another aspect of Example 4 disclosed above, in the case where the first TB generated by the first TB generation module P402 has already been present at the time when the uplink transmission data of the first wireless service has occurred, the transmission data of the first wireless service is multiplexed in the region (puncture region) obtained by puncturing part of the data region where the first TB is stored. Thereby, the transmission delay of the transmission data of the first wireless service that has occurred after the uplink radio resource allocation processing by the LCP algorithm module P401 is completed can be shortened. Such a function is useful for implementing uplink ultra-reliable and low-latency communications in the 5G system.

According to still another aspect of Example 4 disclosed above, in the UE 10 capable of wirelessly communicating with the gNB 20 using a plurality of wireless services including the first wireless service having a priority higher than another wireless service (which can also be called second wireless service) and the second wireless service, the first processing system that is an uplink processing system of the first wireless service and the second processing system that is an uplink processing system of the second wireless service are implemented. Thereby, in the case where the TB of the second processing system has already been prepared at the time when the uplink transmission data of the first wireless service has occurred, the transmission data of the first wireless service is multiplexed in the partially punctured region (puncture region) of the TB of the second processing system. On the other hand, in the case where the TB of the second processing system has not been prepared yet at the time when the uplink transmission data of the first wireless service has occurred, the transmission data of the first wireless service is processed by the first processing system. With such a configuration, the transmission delay of the uplink transmission data of the first wireless service can be shortened. Such a function is useful for implementing uplink ultra-reliable and low-latency communications in the 5G system.

<Example 5> In Example 5, a configuration of controlling a value of an LCP flag by RRC signaling will be described. As described above, the LCP flag is used to control whether to execute interrupt communication (S201 in FIG. 6).

Figure 17:
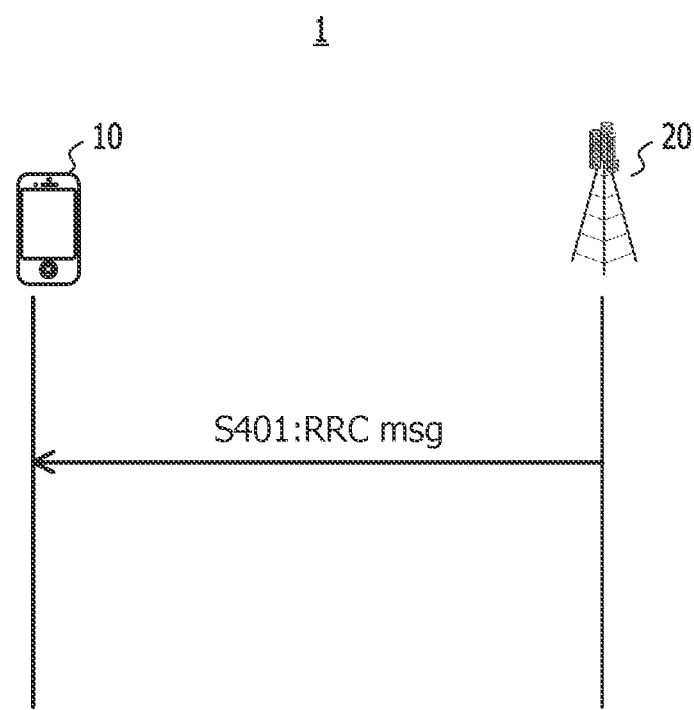
FIG. 17 is a diagram illustrating an example of a notification sequence of setting information in a wireless communication system 1 according to Example 5.

FIG. 17 is a diagram illustrating an example of a notification sequence of setting information in a wireless communication system 1 according to Example 5. In FIG. 17, an RRC message (RRC msg) including setting information (which can also be called second setting information) according to Example 5 is transmitted from a gNB 20 to a UE 10 (S401). The UE 10 may share the second setting information with the gNB 20 by receiving the RRC message transmitted from the gNB 20. In FIG. 17, the RRC message including the second setting information may be, for example, an RRC message transmitted/received at the time of setting wireless communication between the UE 10 and the gNB 20. Such an RRC message may be, for example, one of an RRC connection reconfiguration message, an RRC connection setup message, and a security mode command message. Furthermore, FIG. 17 illustrates an example of notifying the second setting information using the RRC message. However, the present disclosure is not limited to the example. For example, in the wireless communication system 1 according to Example 5, the second setting information may be transmitted from the gNB 20 to the UE 10 using a notification signal. Such notification information may be, for example, one of a master information block (MIB) and various system information blocks (SIBs).

Figure 18:
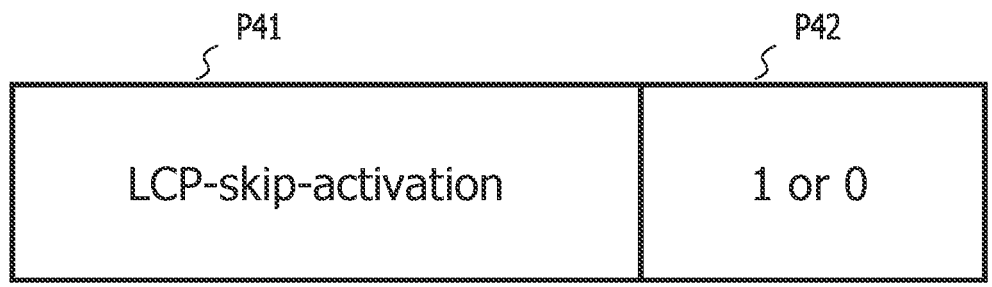
FIG. 18 is a diagram illustrating a content example of the setting information according to Example 5.

FIG. 18 is a diagram illustrating a content example of the setting information according to Example 5. In the setting information in FIG. 18, "1" or "0" is set as a value (P42) for an information element "LCP-skip-activation" (P41). For example, in a case where the value (P42) of the information element "LCP-skip-activation" (P41) is "1", the UE 10 may set an LCP flag to ON. On the other hand, in a case where the value (P42) of the information element "LCP-skip-activation" (P41) is "0", the UE 10 may set the LCP flag to OFF. Thus, the UE 10 may control the value of the LCP flag according to the value of the setting information notified by RRC signaling (that is, the value (P42) of the information element "LCP-skip-activation" (P41)). Note that the information element "LCP-skip-activation" (P41) may also be called first information element.

Note that, although not illustrated in FIG. 18, the setting information according to Example 5 may include not only the information element "LCP-skip-activation" (P41) but also other information elements. For example, the setting information according to Example 5 may include an information element (which can also be called second information element) for setting a position of a puncture region (first region) in which first data is multiplexed.

Figure 19:
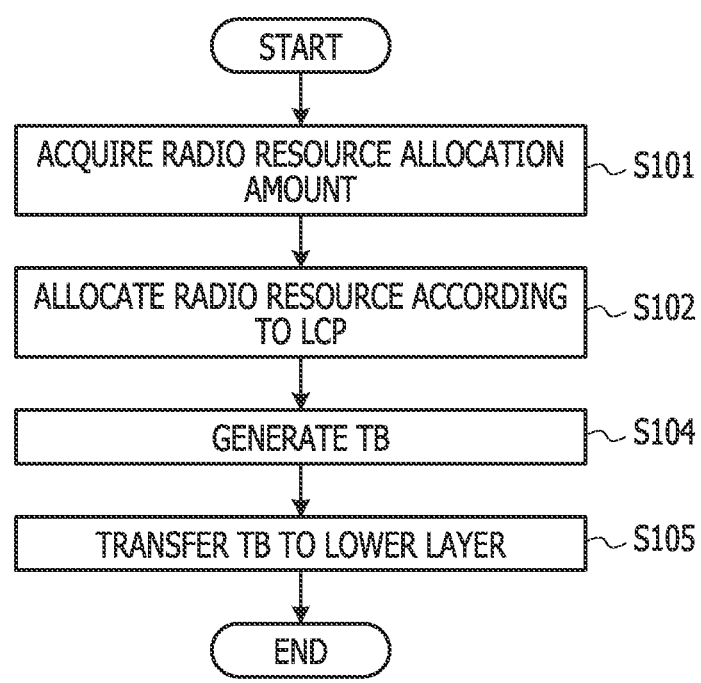
FIG. 19 is a diagram illustrating an example of a flow of first processing of a UE 10 in uplink U-Plane protocol stack according to Example 5.

FIG. 19 is a diagram illustrating an example of a flow of first processing of the UE 10 in uplink U-Plane protocol stack according to Example 5. In FIG. 19, similar parts to those illustrated in FIG. 3 are denoted by the same reference numerals. The first processing in FIG. 19 is different from FIG. 3 in that S103 and S106 in FIG. 3 are omitted and is similar to FIG. 3 in the other points. That is, in the first processing in FIG. 19, processing of setting the LCP flag to ON (S103) is omitted, and processing of generating a TB (S104) is executed after processing of allocating radio resources according to LCP (S102). Furthermore, in the first processing in FIG. 19, processing of setting the LCP flag to OFF (S106) is omitted, and the first processing is terminated until the next execution trigger arrives after execution of processing of transferring the TB to a lower layer (S105).

Note that the UE 10 according to Example 5 may set the value of the LCP flag according to a value indicated by the first information element of the second setting information at timing when receiving a notification including the second setting information illustrated in FIG. 17.

As a modification of the above-described example, the notification including the second setting information may be transmitted from the gNB 20 to the UE 10 by downlink control information (DCI).

According to one aspect of the above-disclosed Example 5, the uplink radio resource allocation is permitted for uplink transmission data of the first wireless service that has occurred after LCP processing of the second processing system in the UE 10 is executed. Thereby, the delay in uplink data transmission of the first wireless service in the UE 10 can be reduced. Such a function is useful for implementing uplink ultra-reliable and low-latency communications in the 5G system.

According to another aspect of Example 5 disclosed above, the processing system for the transmission data of a specific wireless service (which can also be called first wireless service) can be flexibly changed according to the setting information from the wireless base station. Thereby, the delay in uplink data transmission of the first wireless service in the UE 10 can be further reduced. Such a function is useful for implementing uplink ultra-reliable and low-latency communications in the 5G system.

<Example 6> In Example 6, a processing system for transmission data of a specific wireless service (which can also be called first wireless service) is implemented independently from a processing system of another wireless service (which can also be called second wireless service).

Figure 20:
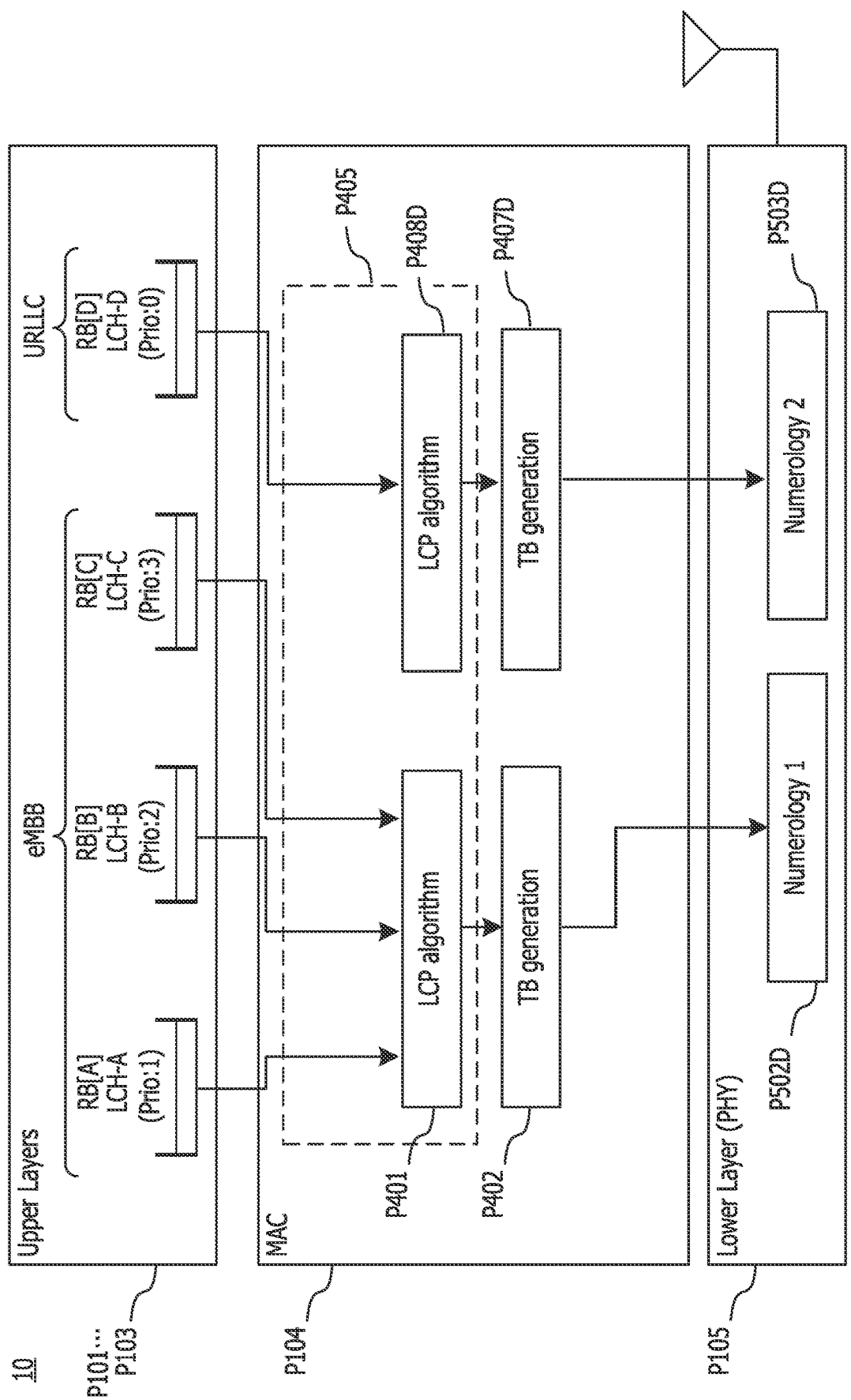
FIG. 20 is a diagram illustrating an example of a functional configuration of U-Plane protocol stack in a UE 10 according to Example 6.

FIG. 20 is a diagram illustrating an example of a functional structure of U-Plane protocol stack in a UE 10 according to Example 6. The structure in FIG. 20 is different from the configuration in FIG. 15 in that the interrupt detection module P404 and the puncture and multiplexing module P403 are omitted, as compared with the example in FIG. 15, and is similar to the configuration in FIG. 15 in the other points.

The UE 10 according to Example 6 illustrated in FIG. 20 includes a first processing system for processing uplink transmission data of the first wireless service (for example, URLLC) and a second processing system for processing uplink transmission data of the second wireless service (for example, eMBB).

In the first processing system in FIG. 20, uplink transmission data (which can also be called first data) of the first wireless service is mapped to a first sub-carrier space (which can also be called first sub-carrier spacing) (SCS)) and wirelessly transmitted by an LCP algorithm module P408D, a TB generation module P407D, and a Numerology2 module P503D.

In the second processing system in FIG. 20, uplink transmission data (which can also be called second data) of the second wireless service is mapped to a second sub-carrier space (which can also be called second SCS) and wirelessly transmitted by an LCP algorithm module P401, a TB generation module P402, and a Numerology1 module P502D.

The UE 10 illustrated in FIG. 20 may include a priority control module P405 according to Example 6. In a case where the uplink transmission data (so-called first data) of the first wireless service is generated, the priority control module P405 according to Example 6 delivers the first data to the LCP algorithm module P408D of the first processing system. Furthermore, in a case where the uplink transmission data (so-called second data) of the second wireless service is generated, the priority control module P405 according to Example 6 delivers the second data to the LCP algorithm module P401 of the second processing system.

Figure 21:
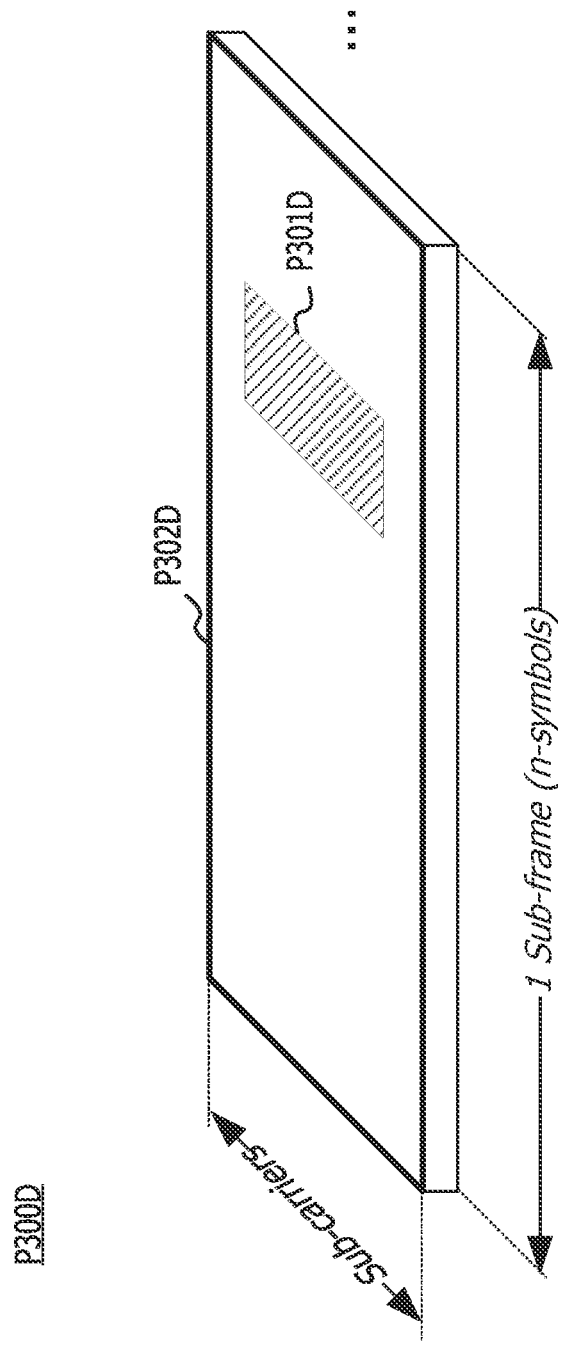
FIG. 21 is a diagram illustrating a configuration example of an uplink sub-frame transmitted by the UE 10 according to Example 6.

Note that the above-described first sub-carrier space may overlap with some radio resources in the second sub-carrier space. FIG. 21 is a diagram illustrating a structure example of an uplink sub-frame P300D transmitted by the UE 10 according to Example 6. In FIG. 21, the sub-frame P300D includes a first sub-carrier space P301D and a second sub-carrier space P302D. For example, a sub-carrier interval in the first sub-carrier space P301D may be shorter than a sub-carrier interval in the second sub-carrier space P302D.

For example, a symbol length in the first sub-carrier space P301D may be longer than a symbol length in the second sub-carrier space P302D.

According to one aspect of the above-disclosed Example 6, the uplink radio resource allocation is permitted for uplink transmission data of the first wireless service that has occurred after LCP processing of the second processing system in the UE 10 is executed. Thereby, the delay in uplink data transmission of the first wireless service in the UE 10 can be reduced. Such a function is useful for implementing uplink ultra-reliable and low-latency communications in the 5G system.

According to another aspect of Example 6 disclosed above, the processing system for the transmission data of a specific wireless service (which can also be called first wireless service) is implemented independently of the processing system of another wireless service (which can also be called second wireless service). Thereby, the delay in uplink data transmission of the first wireless service in the UE 10 can be reduced. Such a function is useful for implementing uplink ultra-reliable and low-latency communications in the 5G system.

<Example 7> A UE 10 according to Example 7 is configured to map uplink transmission data of a first wireless service to either a first sub-carrier space or a second sub-carrier space and wirelessly transmit the transmission data.

Figure 22:
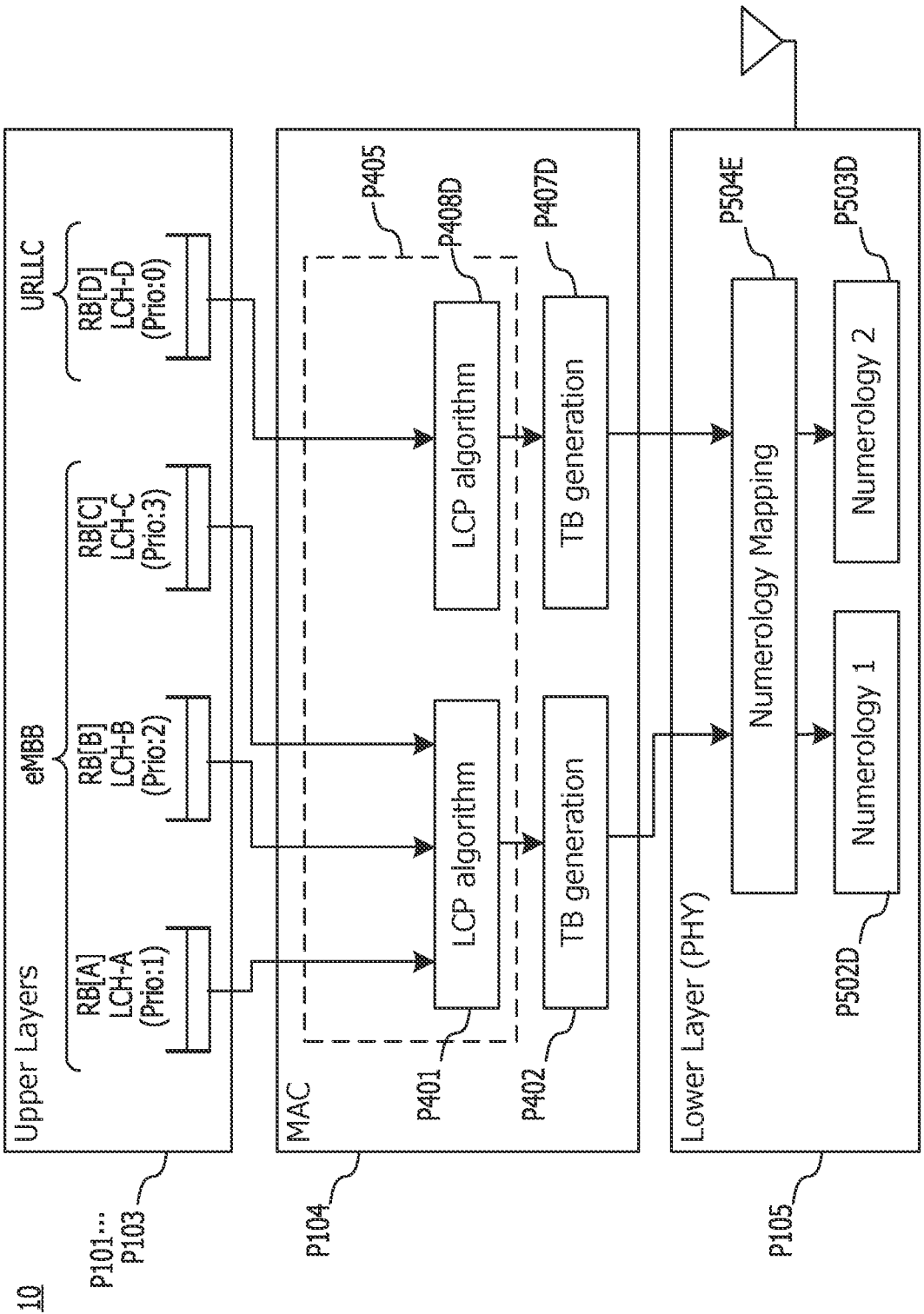
FIG. 22 is a diagram illustrating an example of a functional configuration of U-Plane protocol stack in a UE 10 according to Example 7.

FIG. 22 is a diagram illustrating an example of a functional structure of U-Plane protocol stack in the UE 10 according to Example 7. In FIG. 22, similar parts to those illustrated in FIG. 20 are denoted by the same reference numerals. The configuration illustrated in FIG. 22 is different from the configuration in FIG. 20 in that a Numerology mapping module P504E is added, as compared with the example in FIG. 20, and is similar to the configuration in FIG. 20 in the other points.

The Numerology mapping module P504E according to Example 7 delivers a TB (which can also be called first TB) delivered from a TB generation module P407D of a first processing system to either a Numerology1 module P502D or a Numerology2 module P503D according to setting information (which can also be called third setting information). Furthermore, the Numerology mapping module P504E according to Example 7 supplies a TB (which can also be called second TB) delivered from a TB generation module P402 of a second processing system to either the Numerology1 module P502D or the Numerology2 module P503D according to the third setting information.

The third setting information may be set using, for example, an RRC signal or a notification signal from a gNB 20 as illustrated in FIG. 17.

In FIG. 22, the Numerology mapping module P504E is implemented in a lower layer P105 but this is only an example of Example 7. For example, the Numerology mapping module P504E according to Example 7 may be implemented in a MAC layer P104.

According to one aspect of the above-disclosed Example 7, the uplink radio resource allocation is permitted for uplink transmission data of the first wireless service that has occurred after LCP processing of the second processing system in the UE 10 is executed. Thereby, the delay in uplink data transmission of the first wireless service in the UE 10 can be reduced. Such a function is useful for implementing uplink ultra-reliable and low-latency communications in the 5G system.

According to another aspect of Example 7 disclosed above, the processing system for the transmission data of a specific wireless service (which can also be called first wireless service) is implemented independently of the processing system of another wireless service (which can also be called second wireless service). Thereby, the delay in uplink data transmission of the first wireless service in the UE 10 can be reduced. Such a function is useful for implementing uplink ultra-reliable and low-latency communications in the 5G system.

According to still another aspect of Example 7 disclosed above, the sub-carrier space for the transmission data of a specific wireless service (which can also be called first wireless service) can be flexibly changed according to the setting information. Thereby, the delay in uplink data transmission of the first wireless service in the UE 10 can be further reduced. Such a function is useful for implementing uplink ultra-reliable and low-latency communications in the 5G system.

Figure 23:
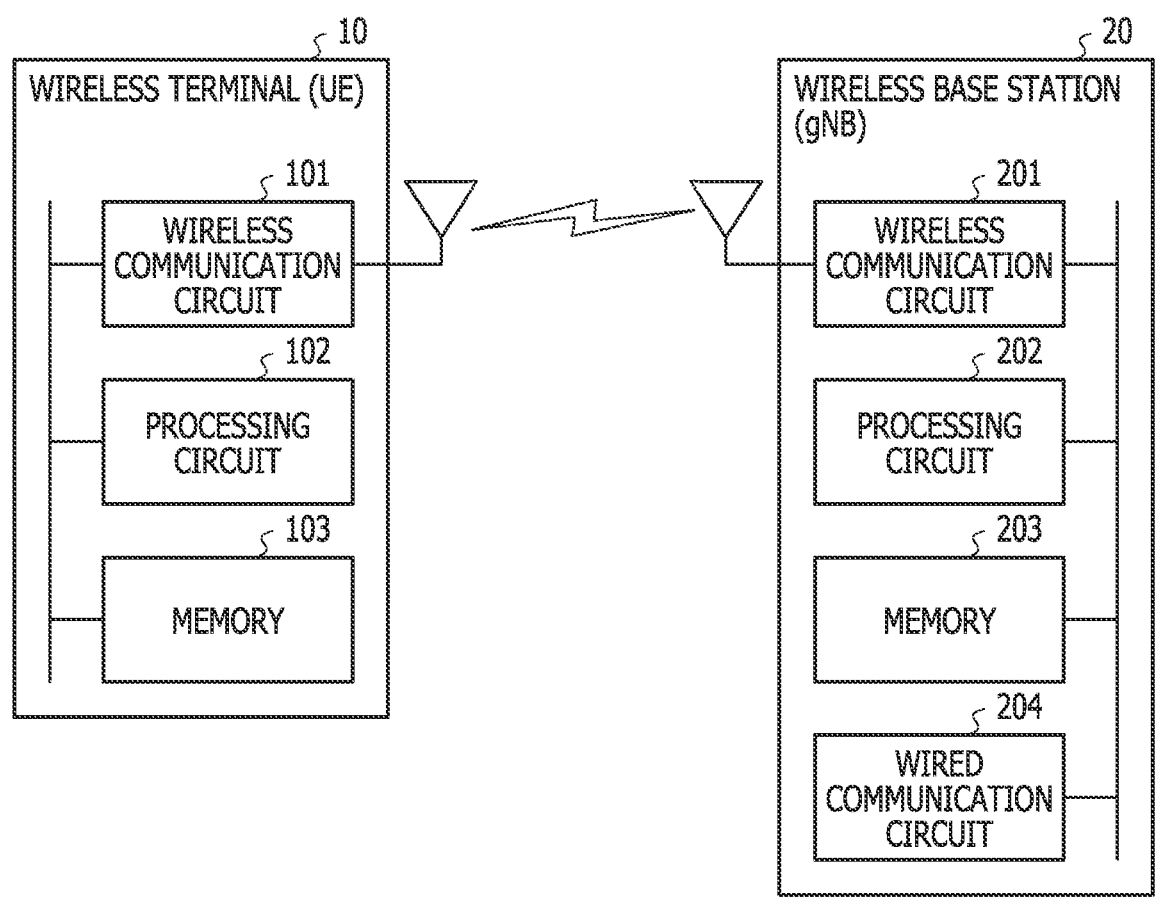
FIG. 23 is a diagram illustrating an example of a hardware configuration of a UE 10 and a gNB 20 in the wireless communication system 1.

<Hardware Configuration> Finally, a hardware configuration of a device used in each of the above-disclosed examples will be briefly described. FIG. 23 is a diagram illustrating an example of a hardware configuration of the wireless terminal (UE 10) and the wireless base station (gNB 20) in the wireless communication system 1. The UE 10 is an example of a transmission device in uplink and an example of a reception device in downlink. The gNB 20 is an example of a reception device in uplink and an example of a transmission device in downlink.

The UE 10 in FIG. 23 includes a wireless communication circuit 101, a processing circuit 102, and a memory 103. Note that, in the UE 10 in FIG. 23, illustration of some components such as an antenna is omitted. Furthermore, the UE 10 may include a display device such as a liquid crystal display, an input device such as a touch panel, a battery such as a lithium-ion rechargeable battery, and the like.

The wireless communication circuit 101 is configured to receive a baseband signal (also called wireless signal or digital wireless signal) from the processing circuit 102, generate a wireless signal (also called second wireless signal or analog wireless signal) at a predetermined output level from the baseband signal, and emit the wireless signal into the space via an antenna. Thereby, the UE 10 can transmit the wireless signal to the gNB 20. Furthermore, the wireless communication circuit 101 is configured to receive the wireless signal input from the antenna, convert the wireless signal into a baseband signal, and supply the baseband signal to the processing circuit 102. Thereby, the UE 10 can receive the wireless signal from the gNB 20. As described above, the wireless communication circuit 101 is configured to be able to transmit and receive the wireless signal and has a function to perform wireless communication with the gNB 20.

The wireless communication circuit 101 may be communicatively connected to the processing circuit 102 via a transmission circuit mounted inside the UE 10. An example of such a transmission circuit includes a transmission circuit compliant with standards such as M-PHY and Dig-RF.

The processing circuit 102 (also called processor circuit or arithmetic circuit) is a circuit configured to perform baseband signal processing. The processing circuit 102 is configured to generate a baseband signal (also called wireless signal or digital wireless signal) on the basis of protocol stack in the wireless communication system 1 and output the baseband signal to the wireless communication circuit 101. Furthermore, the processing circuit 102 is configured to perform reception processing such as demodulation or decoding for the baseband signal input from the wireless communication circuit 101 on the basis of the protocol stack in the wireless communication system 1. In other words, in uplink, the processing circuit 102 comprises a circuit that causes the wireless communication circuit 101 to transmit a wireless signal on the basis of second data obtained by sequentially processing first data addressed to the gNB 20 from an upper layer to a lower layer, according to a procedure of the protocol stack in which the wireless communication function is divided into a plurality of layers. Furthermore, the processing circuit 102 comprises a circuit that sequentially processes the wireless signal received via the wireless communication circuit 101 from a lower layer to an upper layer, according to the procedure of the protocol stack in which the wireless communication function is divided into a plurality of layers. Here, receiving an input of the baseband signal from the wireless communication circuit 101 comprises a receiver that receives the wireless signal from the gNB 20 via the wireless communication circuit 101.

The processing circuit 102 may be an arithmetic device that reads and executes a program stored in the memory 103, for example, to implement operation of the UE 10 according to the above-described respective examples. In other words, the processing circuit 102 comprises an execution entity of the flow of the processing in the UE 10 illustrated in FIGS. 3 and 6. Examples of the processing circuit 102 include a central processing unit (CPU), a micro processing unit (MPU), a digital signal processor (DSP), a field programmable gate array (FPGA), and a combination thereof. Note that the processing circuit 102 may be a multi-core processor including two or more cores. Furthermore, the processing circuit 102 may mount two or more processing circuits 102 according to each of the layers in the protocol stack of the wireless communication system 1. For example, the processing circuit 102 may individually mount a processing circuit 102 that executes processing as a first sub-layer entity (PDCP entity) belonging to a first sub-layer (PDCP layer), a processing circuit 102 that executes processing as a second sub-layer entity (RLC entity) belonging to a second sub-layer (RLC layer), and a processing circuit 102 that executes processing as a third sub-layer entity (MAC entity) belonging to a third sub-layer (MAC layer).

The processing circuit 102 may also be called C-CPU. The UE 10 may mount a processor circuit, which is also called A-CPU for executing an application, in addition to the processing circuit 102. Note that the processing circuit 102 may be mounted on a single chip together with the processor circuit that can also be called A-CPU or may be mounted as a separate chip. As described above, the processing circuit 102 has an aspect as a control unit having a function to control the operation of the UE 10.

The memory 103 is a circuit configured to store data and programs related to the baseband signal processing executed by the processing circuit 102. The memory 103 includes a nonvolatile storage device and/or a volatile storage device. Examples of such storage devices include a random access memory (RAM), a read only memory (ROM), a solid-state drive (SSD), and a hard disk drive (HDD). In FIG. 23, the memory 103 is the collective term for various storage devices such as a main storage and an auxiliary storage. Note that the memory 103 may mount two or more memories 103 according to each of the layers in the protocol stack of the wireless communication system 1, similarly to the processing circuit 102. For example, the memory 103 may individually mount a memory 103 used in the processing as the first sub-layer entity (PDCP entity) belonging to the first sub-layer (PDCP layer), a memory 103 used in the processing as the second sub-layer entity (RLC entity) belonging to the second sub-layer (RLC layer), and a memory 103 used in the processing as the third sub-layer entity (MAC entity) belonging to the third sub-layer (MAC layer).

The gNB 20 illustrated in FIG. 23 includes a wireless communication circuit 201, a processing circuit 202, a memory 203, and a wired communication circuit 204.

In downlink, the wireless communication circuit 201 is configured to receive the baseband signal from the processing circuit 202, generate a wireless signal at a predetermined output level from the baseband signal, and emit the wireless signal into the space via an antenna. Furthermore, in uplink, the wireless communication circuit 201 is configured to receive the wireless signal input from the antenna, convert the wireless signal into a baseband signal, and supply the baseband signal to the processing circuit 202. The wireless communication circuit 201 can be communicatively connected to the processing circuit 202 via a transmission path such as a common public radio interface (CPRI) and can also be called remote radii head (RRH) or remote radio equipment (RRE). Furthermore, the combination of the wireless communication circuit 201 and the processing circuit 202 is not limited to one-to-one, and one wireless communication circuit 201 can correspond to a plurality of the processing circuits 202, a plurality of the wireless communication circuits 201 can correspond to one processing circuit 202, or a plurality of the wireless communication circuits 201 can correspond to a plurality of the processing circuits 202. As described above, the wireless communication circuit 201 has an aspect as a communication unit (which can also be called transmission/reception unit or second transmission/reception unit) having the function to perform wireless communication with the UE 10.

The processing circuit 202 is a circuit configured to perform the baseband signal processing. In downlink, the processing circuit 202 is configured to generate a baseband signal on the basis of the protocol stack in the wireless communication system and output the baseband signal to the wireless communication circuit 201. Furthermore, in uplink, the processing circuit 202 is configured to perform the reception processing such as demodulation or decoding for the baseband signal input from the wireless communication circuit 201 on the basis of the protocol stack in the wireless communication system. In other words, in downlink, the processing circuit 202 comprises a circuit that sequentially processes the transmission data addressed to the UE 10 as a reception device from an upper layer to a lower layer and transmits the data via the wireless communication circuit 201, according to the procedure of the protocol stack in which the wireless communication function is divided into a plurality of layers. Furthermore, in uplink, the processing circuit 202 comprises a circuit that sequentially processes the wireless signal received via the wireless communication circuit 201 from a lower layer to an upper layer, according to the procedure of the protocol stack in which the wireless communication function is divided into a plurality of layers. Here, in uplink, receiving an input of the baseband signal from the wireless communication circuit 201 comprises a receiver that receives the wireless signal from the UE 10 via the wireless communication circuit 201.

The processing circuit 202 may be an arithmetic device that reads and executes a program stored in the memory 203, for example, to implement operation of the gNB 20 according to the above-described examples respectively. Examples of the processing circuit 202 include a central processing unit (CPU), a micro-processing unit (MPU), a digital signal processor (DSP), and a field programmable gate array (FPGA). Note that the processing circuit 202 may be a multi-core processor including two or more cores. Furthermore, the processing circuit 202 may mount two or more processing circuits 202 according to each of the layers in the protocol stack of the wireless communication system. For example, the processing circuit 202 may individually mount a processing circuit 202 that executes processing as a MAC entity belonging to the MAC layer, a processing circuit 202 that executes processing as an RLC entity belonging to the RLC layer, and a processing circuit 202 that executes processing as a PDCP entity belonging to the PDCP layer. As described above, the processing circuit 202 has an aspect as a control unit having a function to control the operation of the wireless base station 20 (may also be called second control unit to be distinguished from the control unit of the UE 10). For example, the processing circuit 202 executes processing of transmitting various types of information (for example, first setting information and second setting information) to the UE 10. Note that the various types of setting information may also be called control signal.

The memory 203 is a circuit configured to store and retain data and programs related to the baseband signal processing executed by the processing circuit 202. The memory 203 includes a nonvolatile storage device and/or a volatile storage device. Examples of such storage devices include a random access memory (RAM), a read only memory (ROM), a solid-state drive (SSD), and a hard disk drive (HDD). In FIG. 23, the memory 203 is the collective term for various storage devices such as a main storage and an auxiliary storage. Note that the memory 203 may mount two or more memories 203 according to each of the layers in the protocol stack of the wireless communication system, similarly to the processing circuit 202. For example, the memory 203 may individually mount a memory 203 used in the processing as a MAC entity belonging to the MAC layer, a memory 203 used in the processing as an RLC entity belonging to the RLC layer, and a memory 203 used in the processing as a PDCP entity belonging to the PDCP layer.

The wired communication circuit 204 converts data into packet data with format that can be output to another device and transmits the packet data to the another device, and extracts data or the like from packet data received from another device and outputs the extracted data or the like to the memory 203, the processing circuit 202, and the like. Examples of the another device include another wireless base station, a mobility management entity (MME), a serving gateway (SGW), and the like. The MME and SGW are also called core nodes, and a logical communication interface used for communication with the core nodes can also be called S1 interface. A logical communication interface used for communication with another wireless base station can also be called X2 interface.

From the above detailed description, the characteristics and advantages of the present disclosure will become clear. This is intended that the claims cover the above-described characteristics and advantages of the present disclosure without departing from the spirit and the scope of the claims. Further, any person having ordinary knowledge in the technical field should be able to easily come up with various improvements and modifications. Therefore, there is no intention to limit the range of disclosure having inventiveness to those described above, and the range of disclosure can be based on appropriate improvements and equivalents included in the range disclosed in the present specification. For example, the respective steps disclosed in this specification do not need to be carried out chronologically in the order described as an example of the processing flow, and the sequence of the steps may be changed within the scope of the gist of the present disclosure described in the claims. Alternatively, a plurality of steps may be carried out in parallel. Note that situations that can occur in the 5G system that are clarified in the above detailed description can be found when the 5G system is examined from one aspect, and other situations can be found when the situations examined from other aspects. In other words, the features and advantages of the present disclosure are not limited to applications for solving the problems specified in the above detailed description.

For example, in the above description, a configuration regarding uplink (which can also be called UL) has been described, but it goes without saying that the gist of the present disclosure can be applied to downlink (which can also be called DL). In the case where the present disclosure is applied to downlink, the wireless base station gNB 20 in the above description may be read as a wireless terminal UE 10. Furthermore, the wireless terminal UE 10 may be read as a wireless base station gNB 20. In other words, when focusing on downlink, the UE 10 is an example of a transmission device of the wireless communication system 1 and the gNB 20 is an example of a reception device according to the present disclosure. Therefore, in the case of applying the technical idea according to the present disclosure to downlink, the function described for the UE 10 as an example of the uplink transmission device may be simply applied to the gNB 20 as an example of the downlink transmission device. Note that notification of control information is transmitted from the gNB 20 to the UE 10 even in the case of applying the technical idea according to the present disclosure to downlink.

Lastly, the configurations of the examples and modifications in the present disclosure are examples for embodying the technical idea of the present disclosure, and it is not intended that the present disclosure is limited to the configurations of these respective examples and modifications and the present disclosure is equally applicable to other embodiments within the scope of the claims. For example, note that the terms in the present disclosure may be renamed in future 5G system specification development. Furthermore, note that one or more alternative names listed for terms in the present disclosure may be synonymous with each other.

All examples and conditional language provided herein are intended for the pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that the various changes, substitutions, and alterations could be made hereto without departing from the spirit and scope of the disclosure.

What is claimed is:

1. A transmission device comprising:
    a communication circuit configured to wirelessly communicate with a reception device, by using a plurality of wireless services including a first wireless service having a first priority and a second wireless service having a second priority that is a priority lower than the first priority; and
    a processing circuit configured to control a logical channel prioritization (LCP) algorithm in a case of overlapping uplink radio resource grants, in accordance with a first information element included in a radio resource control (RRC) message received from the reception device, the controlling of the LCP algorithm allocating an uplink radio resource to transmission data of the first wireless service in a case where the transmission data of the first wireless service is detected in a buffer associated with the first wireless service when a medium access control-protocol data unit (MAC-PDU) has been generated or can be generated in response to the LCP algorithm allocating the uplink radio resource to transmission data of the second wireless service.

2. A reception device comprising:
a communication circuit configured to wirelessly communicate with a transmission device by using a plurality of wireless services including a first wireless service having a first priority and a second wireless service having a second priority that is a priority lower than the first priority; and
a processing circuit configured to transmit to the transmission device a radio resource control (RRC) message including a first information element, the first information element indicating a value configured to cause the transmission device to control a logical channel prioritization (LCP) algorithm in a case of overlapping uplink radio resource grants, in accordance with the first information element, the control of the LCP algorithm allocating an uplink radio resource to transmission data of the first wireless service in a case where the transmission data of the first wireless service is detected in a buffer associated with the first wireless service when a medium access control-protocol data unit (MAC-PDU) has been generated or can be generated in response to the LCP algorithm allocating uplink radio resource to transmission data of the second wireless service.

3. A wireless communication method executed in a transmission device capable of wirelessly communicating with a reception device, using a plurality of wireless services including a first wireless service having a first priority and a second wireless service having a second priority that is a priority lower than the first priority, the wireless communication method comprising:

obtaining a first information element included in a radio resource control (RRC) message received from the reception device; and
controlling a logical channel prioritization (LCP) algorithm in a case of overlapping uplink radio resource grants, in accordance with the first information element, the controlling of the LCP algorithm allocating an uplink radio resource to transmission data of the first wireless service in a case where the transmission data of the first wireless service is detected in a buffer associated with the first wireless service when a medium access control-protocol data unit (MAC-PDU) has been generated or can be generated in response to the LCP algorithm allocating the uplink radio resource to transmission data of the second wireless service.

4. A wireless communication system providing a plurality of wireless services including a first wireless service having a first priority and a second wireless service having a second priority that is a priority lower than the first priority between a reception device and a transmission device, wherein
the reception device and the transmission device are configured to share first information element included in a radio resource control (RRC) message received from the reception device, and
the transmission device is configured to:
control a logical channel prioritization (LCP) algorithm in a case of overlapping uplink radio resource grants, in accordance with the first information element, the control of the LCP algorithm allocating an uplink radio resource to transmission data of the first wireless service in a case where the transmission data of the first wireless service is detected in a buffer associated with the first wireless service when a medium access control-protocol data unit (MAC-PDU) has been generated or can be generated in response to the LCP algorithm allocating the uplink radio resource to transmission data of the second wireless service.

\* \* \* \* \*